US005545954A

United States Patent [19]

Furukoshi

[11] Patent Number: 5,545,954

[45] Date of Patent: Aug. 13, 1996

[54] DRIVE CIRCUIT FOR ULTRASONIC MOTOR

[75] Inventor: Hiroyuki Furukoshi, Aichi-ken, Japan

[73] Assignee: Asmo Co., Ltd., Shizuoka-ken, Japan

[21] Appl. No.: 388,406

[22] Filed: Feb. 14, 1995

[30] Foreign Application Priority Data

Feb. 18, 1994 [JP] Japan .................................... 6-020952

[51] Int. Cl.$^6$ ...................................................... H02N 10/00

[52] U.S. Cl. .......................... 318/116; 310/316; 310/319; 310/311

[58] Field of Search .................................... 310/325, 316, 310/323, 311, 317, 314, 319; 318/116–118

[56] References Cited

U.S. PATENT DOCUMENTS

| | | | |
|---|---|---|---|
| 5,192,889 | 3/1993 | Myohga | 310/316 |
| 5,214,339 | 5/1993 | Naito | 310/316 |
| 5,233,274 | 8/1993 | Honda et al. | 310/323 |
| 5,365,139 | 11/1994 | Kasuga et al. | 310/116 |

FOREIGN PATENT DOCUMENTS

| | | |
|---|---|---|
| 59-185178 | 10/1984 | Japan . |
| 62-203575 | 9/1987 | Japan . |
| 1-255482 | 10/1989 | Japan . |
| 3-159583 | 7/1991 | Japan . |
| 6-178556 | 6/1994 | Japan . |

*Primary Examiner*—John W. Cabeca
*Attorney, Agent, or Firm*—Fisher & Associates

[57] ABSTRACT

A drive circuit for an ultrasonic motor and, more particularly, a drive circuit for an ultrasonic motor which supplies the ultrasonic motor with drive signals of a predetermined frequency and controls the frequency of the drive signals to drive the ultrasonic motor is disclosed. The disclosed drive circuit for an ultrasonic motor drives an ultrasonic motor without generating a remarkable audible sound, even when a detection signal exceeds a predetermined level within a very short time due to the generation of an audible sound in the ultrasonic motor.

7 Claims, 17 Drawing Sheets

Fig. 1A  NO IRREGULARITY IN WAVEFORM, FREQUENCIES OF DRIVE SIGNALS > DRIVE FREQUENCY BAND

Fig. 1B  NO IRREGULARITY IN WAVEFORM, FREQUENCIES OF DRIVE SIGNALS = DRIVE FREQUENCY BAND

Fig. 1C  IRREGULARITY EXISTS IN WAVEFORM, PULSE WIDTH D OF LARGE AMPLITUDE PULSE : WIDE

Fig. 1D  IRREGULARITY EXITS IN WAVEFORM, PULSE WIDTH D OF LARGE AMPLITUDE PULSE : NARROW

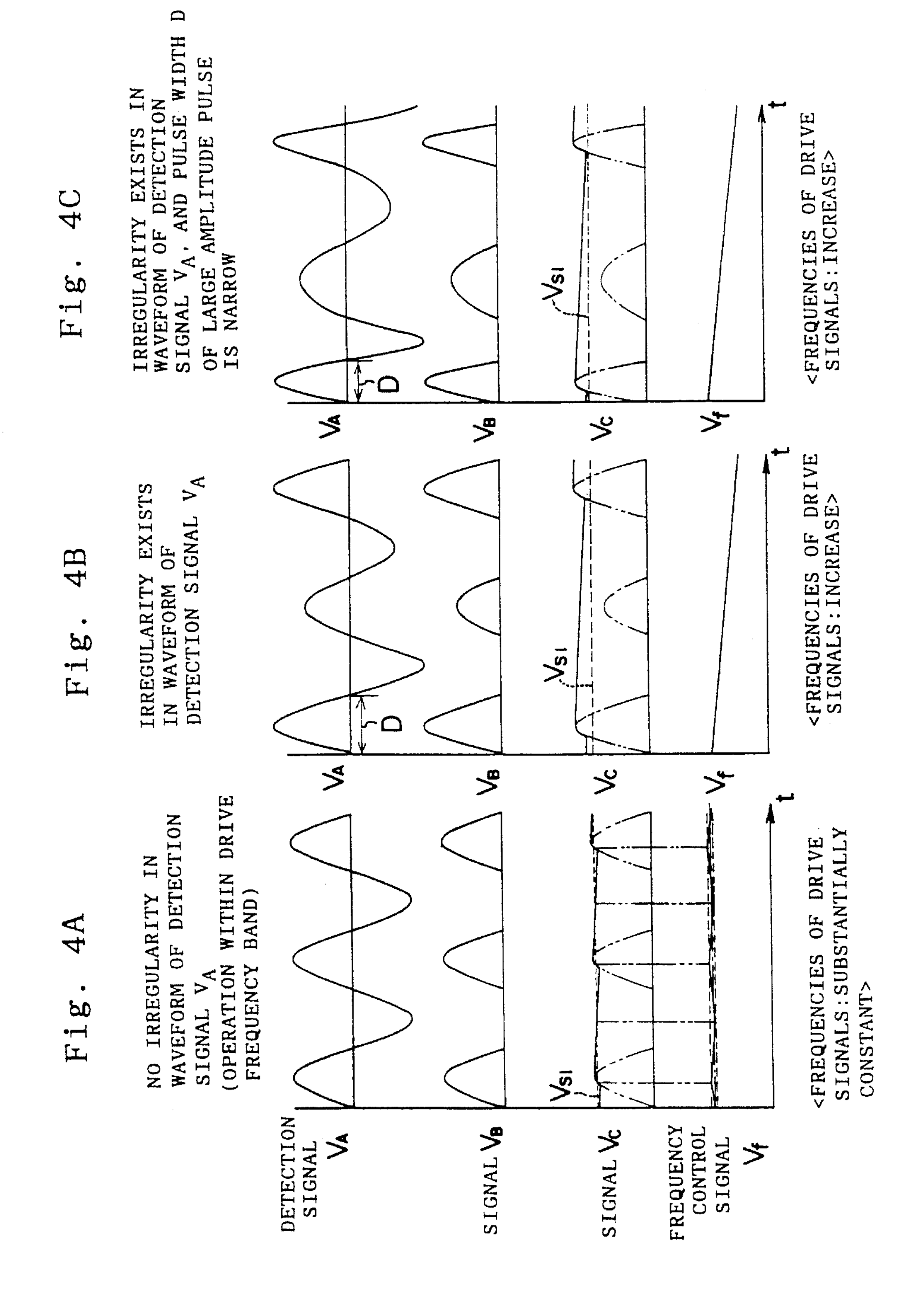
Fig. 4A
NO IRREGULARITY IN WAVEFORM OF DETECTION SIGNAL $V_A$ (OPERATION WITHIN DRIVE FREQUENCY BAND)
Fig. 4B
IRREGULARITY EXISTS IN WAVEFORM OF DETECTION SIGNAL $V_A$
Fig. 4C
IRREGULARITY EXISTS IN WAVEFORM OF DETECTION SIGNAL $V_A$, AND PULSE WIDTH D OF LARGE AMPLITUDE PULSE IS NARROW
DETECTION SIGNAL $V_A$
SIGNAL $V_B$
SIGNAL $V_C$
FREQUENCY CONTROL SIGNAL $V_f$
$V_{S1}$
D
t
<FREQUENCIES OF DRIVE SIGNALS:SUBSTANTIALLY CONSTANT>
<FREQUENCIES OF DRIVE SIGNALS:INCREASE>
<FREQUENCIES OF DRIVE SIGNALS:INCREASE>

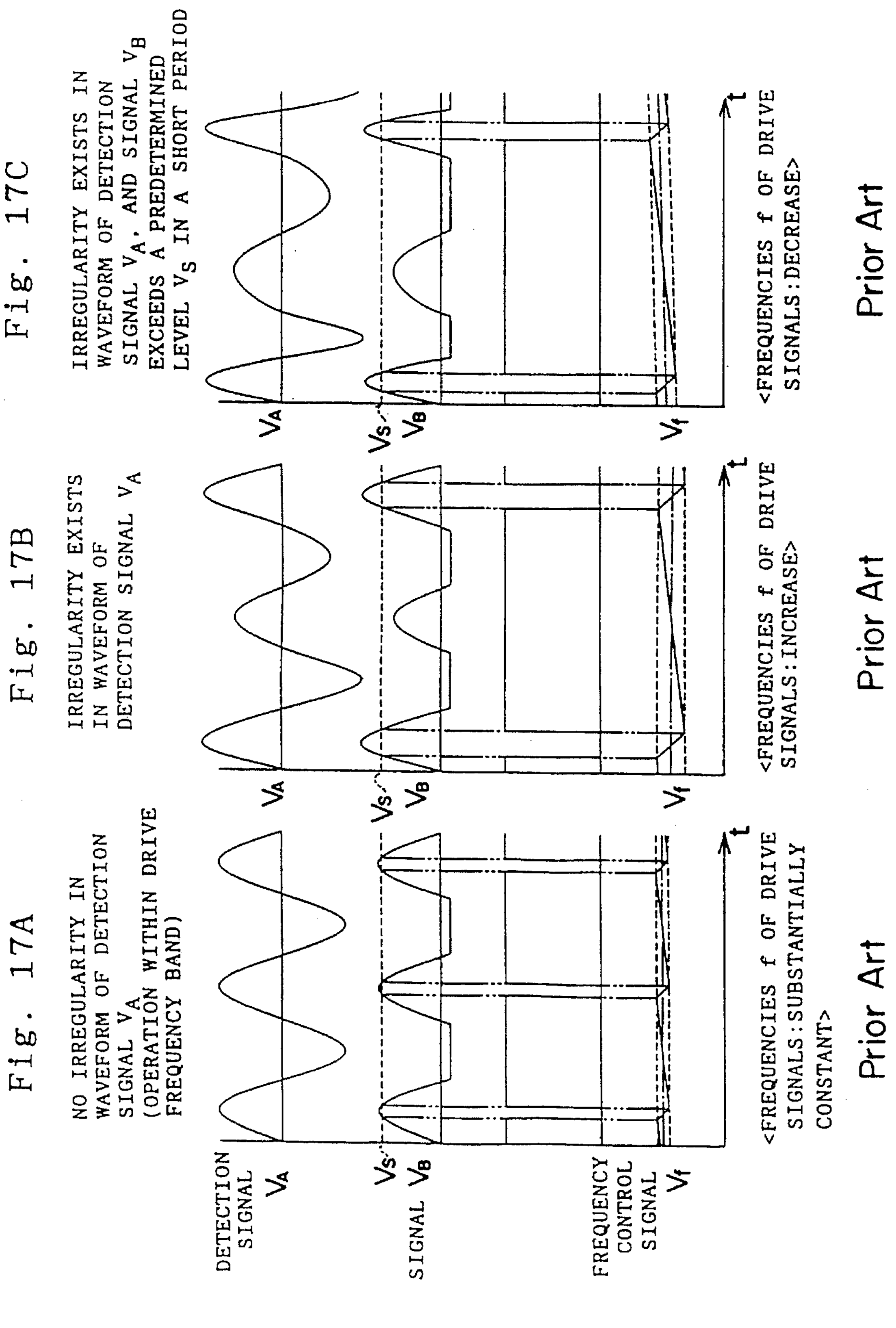
Fig. 17A
NO IRREGULARITY IN WAVEFORM OF DETECTION SIGNAL $V_A$ (OPERATION WITHIN DRIVE FREQUENCY BAND)
DETECTION SIGNAL $V_A$
$V_S$
SIGNAL $V_B$
FREQUENCY CONTROL SIGNAL $V_f$
t
<FREQUENCIES f OF DRIVE SIGNALS:SUBSTANTIALLY CONSTANT>
Prior Art
Fig. 17B
IRREGULARITY EXISTS IN WAVEFORM OF DETECTION SIGNAL $V_A$
$V_A$
$V_S$
$V_B$
$V_f$
t
<FREQUENCIES f OF DRIVE SIGNALS:INCREASE>
Prior Art
Fig. 17C
IRREGULARITY EXISTS IN WAVEFORM OF DETECTION SIGNAL $V_A$, AND SIGNAL $V_B$ EXCEEDS A PREDETERMINED LEVEL $V_S$ IN A SHORT PERIOD
$V_A$
$V_S$
$V_B$
$V_f$
t
<FREQUENCIES f OF DRIVE SIGNALS:DECREASE>
Prior Art

DRIVE CIRCUIT FOR ULTRASONIC MOTOR

BACKGROUND OF THE INVENTION

1. Field of the Invention

The present invention relates to a drive circuit for an ultrasonic motor, and more particularly to a drive circuit for an ultrasonic motor which supplies the ultrasonic motor with drive signals of a predetermined frequency, and controls the frequency of the drive signals to drive the ultrasonic motor.

2. Description of the Prior Art

Conventionally, ultrasonic motors have been known in which ultrasonic vibration is utilized to generate a driving force. A traveling-wave type ultrasonic motor, one type of ultrasonic motor is driven by supplying the piezoelectric body with two-phase signals from a drive circuit, which signals are of respective predetermined frequencies and have a phase difference of 90° therebetween. Due to mechanical vibration of the piezoelectric body generated by the drive signals, an ultrasonic vibration (traveling wave) whose loops and nodes travel in a circumferential direction along the elastic body is excited in the elastic body attached to the piezoelectric body. Due to the traveling wave, a rotor which is press-contacted to the elastic body and a drive shaft are rotated.

The amplitude of the mechanical vibration generated in the piezoelectric body reaches the maximum when the frequencies of the drive signals coincide with the resonant frequency. However, within an audible sound generating band (see FIG. 16) including the resonant frequency, abnormal vibrations of an audible frequency are generated in the elastic body, and the vibrations lower the rotational speed of the rotor and the efficiency of the ultrasonic motor. Accordingly, the ultrasonic motor is driven such that drive signals whose frequencies are sufficiently greater than the audible sound generating band are initially supplied to the ultrasonic motor. The frequencies of the drive signals are then gradually lowered so as to enter a drive frequency band slightly greater than the audible sound generating band and are then maintained within this drive frequency band. However, the audible sound generating band and the drive frequency band of the ultrasonic motor change depending on the ambient temperature of the ultrasonic motor and the magnitude of the load acting on the ultrasonic motor. Accordingly, the frequencies of the drive signals must be varied in accordance with variations in the ambient temperature, load, etc.

As an example of frequency control of drive signals, a technique is disclosed in Japanese Patent Application Laid-open No. 62-203575 in which an AC detection signal output from a piezoelectric element which detects mechanical vibrations of the elastic body is subjected to half-wave rectification by a diode, followed by integration with a resistor and a capacitor. The frequency is controlled such that the level of the integrated signal becomes a predetermined value lower than a predetermined level which is obtained at the above-mentioned resonant frequency. Another technique is disclosed in Japanese Patent Application Laid-open No. 3-159583 in which irregularity of the waveform of a detection signal output from a piezoelectric element is monitored, and the frequencies of drive signals are lowered when irregularity of the waveform does not occur. On the contrary, when irregularity of the waveform occurs, it is judged that the frequencies of the drive signals have entered the audible sound generating band, and the frequencies are raised.

In the frequency control arrangement disclosed in Japanese Patent Application Laid-open No. 62-203575, if the level of the integrated detection signal is lower than the predetermined level, the frequency is lowered even when the frequencies of the drive signals enter the audible sound generating band and irregularity of the drive signals occurs. Accordingly, this frequency control arrangement has the drawback that the frequencies of the drive signals enter the audible sound generating band so that a remarkable audible sound is sometimes generated from the ultrasonic motor. Further, among various ultrasonic motors, there are some ultrasonic motors in which irregularity of the waveform of the detection signal does not occur even when the frequencies of the drive signals enter the audible sound generating band. When the frequency control method disclosed in Japanese Patent Application Laid-open No. 3-159583 is used for driving the above-mentioned ultrasonic motor, the frequencies of the drive signals are lowered and enter the audible sound generating band, and are further lowered, passing the resonant frequency, because irregularity of the waveform of the detection signal does not occur even when the frequencies of the drive signals enter the audible sound generating band. Accordingly, this frequency control method is not suitable for ultrasonic motors in which irregularity of the waveform of the detection signal does not occur in the audible sound generating band.

Meanwhile, the inventors of the present invention have proposed a drive circuit for an ultrasonic motor which has solved the above-described problems, as described in the Japanese Patent Application Laid-open No. 6-178556. In this drive circuit, the level of a detection signal is compared with a predetermined level which is previously set. If the level of the detection signal exceeds the predetermined level, the frequencies of the drive signals are raised only in the period when the level of the detection signal is greater than the predetermined level. On the contrary, if the level of the detection signal falls below the predetermined level, the frequencies of the drive signals are lowered only in the period when the level of the detection signal is lower than the predetermined level. The predetermined levels, and the amounts of variation in the frequencies in each period may be set such that the amount of variation for raising the frequencies in the period where the level of the detection signal is greater than the predetermined level becomes equal to the amount of variation for lowering the frequencies in the period where the level of the detection signal is lower than the predetermined level, for example, in case where the frequencies of the drive signals are set to the optimum drive frequency.

When the frequencies of the drive signals coincide with the optimum drive frequency, as shown in FIG. 17A, an amount of variation by which the level of the frequency control signal Vf is lowered (thereby the frequencies of the drive signals are increased) during the period where the level of a signal $V_B$ obtained by rectifying a detection signal $V_A$ is greater than a predetermined level Vs becomes equal to an amount of variation by which the level of the frequency control signal Vf is raised (thereby the frequencies of the drive signals are decreased) during the period where the level of the signal $V_B$ is lower than the predetermined level Vs. Accordingly, the frequencies of the drive signals are controlled by the frequency control signal $V_f$ to maintain the present values as a whole.

When the frequencies of the drive signals enter the. audible sound generating band, irregularity of the waveform of the detection signal $V_A$ occurs so that the signal $V_B$ mixedly has large amplitudes greatly exceeding the predetermined level $V_S$ and small amplitudes not reaching the predetermined level $V_S$. As a whole, the periods exceeding the predetermined level become longer due to the large amplitudes, compared to when the driving is performed at the optimum drive frequency. Accordingly, the level of the frequency control signal $V_f$ gradually decreases as a whole, as shown in FIG. 17B, so that the frequencies of the drive signals are varied to become higher as a whole.

In the case of driving an ultrasonic motor in which irregularity of the waveform of the detection signal does not occur in the audible sound generating band, the amplitude of the detection signal $V_A$ increases when the frequencies of the drive signals enter the audible sound generating band, even though no irregularity occur in the waveform of the detection signal $V_A$ (not shown in the drawing). Accordingly, the periods in which the level of the detection signal exceeds the predetermined level $V_S$ become longer, so that the frequencies f of the drive signals are varied to become higher, like in the above-described case. This operation allows driving of the ultrasonic motor in which irregularity of the waveform of the detection signal does not occur in the audible sound generating band.

However, depending on the amplitudes of the drive signals, the frequencies of the drive signals, the magnitude of a load acting on the ultrasonic motor, and the like, there are cases where the periods in which the signal $V_B$ obtained by rectifying the detection signal $V_A$ is greater than the predetermined level $V_S$ become very short, as shown in FIG. 17C, even though the ultrasonic motor generates an audible sound and irregularity occurs in the detection signal. Also, when the rotational velocity of the rotor decreases due to a large load acting on the ultrasonic motor, a considerable difference is produced between the traveling speed of the traveling wave in the stator and the rotational speed of the rotor, so that friction occurs therebetween and abnormal vibrations of audible frequencies are generated at the stator, leading to the generation of an audible sound. In such a state, there are cases where the level of the detection signal is low even though irregularity occurs in the detection signal, and the state continues in which the level of the detection signal is lower than the predetermined level.

As described above, it is desired to increase the frequencies of the drive signals to prevent the ultrasonic motor from generating a remarkable audible sound when irregularity of the detection signal occurs. To the contrary, in the technique disclosed in the above-described Japanese Patent Application Laid-open No. 6-178556, although the frequencies of the drive signals are raised when the level of the detection signal exceeds the predetermined level, the level of the frequency control signal Vf is raised (see FIG. 17C), i.e., the frequencies of the driving signals are further lowered when the amplitude of the detection signal is small so that the periods in which the level of the detection signal is greater than the predetermined level become short, or the state continues in which the level of the detection signal does not exceed the predetermined level. Accordingly, the drive circuit has a problem that it allows the ultrasonic motor to generate a remarkable audible sound.

To overcome the above-described problem, the load acting on the ultrasonic motor and the rotational speed of the rotor may be detected with various sensors to compensate the level of the detection signal or the predetermined level based on the detected conditions. However, in this case, the problem arises that the ultrasonic motor becomes larger and the costs of the ultrasonic motor increases because various sensors must be attached to the ultrasonic motor.

SUMMARY OF THE INVENTION

The present invention has been accomplished by taking the above-mentioned facts into consideration, and its object is to provide a drive circuit for an ultrasonic motor which is capable of driving the ultrasonic motor without generating a remarkable audible sound even in the case where the period in which the level of a detection signal exceeds a predetermined level due to the generation of an audible sound in the ultrasonic motor is very short, or the state continues in which the level of the detection signal does not exceed the predetermined level.

To achieve the above-mentioned objects, there is provided a drive circuit for an ultrasonic motor which includes drive signal output means for outputting ultrasonic motor drive signals of predetermined frequencies, detection means for detecting vibration of a stator of the ultrasonic motor and for outputting a detection signal whose amplitude corresponds to the vibration, signal output means for causing the level of an output signal thereof to coincide with the level of the detection signal when the level of the detection signal exceeds the level of the output signal and for lowering the level of the output signal at a decrease rate smaller than a predetermined value when the level of the detection signal is smaller than the level of the output signal, and frequency control means for controlling the frequencies of the drive signals based on the signal output from the signal output means.

The frequency control means may control the frequencies of the drive signals based on the level of the signal output from the signal output means, or the magnitude of variation in the level of the signal output from the signal output means.

A drive circuit for an ultrasonic motor is provided which includes drive signal output means for outputting ultrasonic motor drive signals of predetermined frequencies, detection means for detecting vibration of a stator of the ultrasonic motor and for outputting a detection signal whose amplitude corresponds to the vibration, signal output means for causing the level of an output signal thereof to coincide with the level of the detection signal when the level of the detection signal exceeds the level of the output signal and for lowering the level of the output signal at a decrease rate smaller than a predetermined value when the level of the detection signal is smaller than the level of the output signal, and frequency control means for raising the frequencies of the drive signals when the average level of the signal output from the signal output means is greater than a first reference level and for lowering the frequencies of the drive signals when the average level of the signal output from the signal output means is smaller than the first reference level.

The frequency control means may detect the average level of the signal output from the signal output means based on the ratio between the period in which the level of the signal output from the signal output means is greater than a second reference level and the period in which the level of the signal is smaller than the second reference level.

A drive circuit for an ultrasonic motor is provided which includes drive signal output means for outputting ultrasonic motor drive signals of predetermined frequencies, detection means for detecting vibration of a stator of the ultrasonic motor and for outputting a detection signal whose amplitude corresponds to the vibration, signal output means for causing the level of an output signal thereof to coincide with the level of the detection signal when the level of the detection signal exceeds the level of the output signal and for lowering the level of the output signal at a decrease rate smaller than a predetermined value when the level of the detection signal is smaller than the level of the output signal, and frequency control means for raising the frequencies of the drive signals when the magnitude of variation in the level of the signal output from the signal output means is greater than a reference value and for lowering the frequencies of the drive signals when the magnitude of variation in the level of the signal output from the signal output means is smaller than the reference value.

The frequency control means may detect the magnitude of variation in the level of the signal output from the signal output means based on the level of a smoothed signal of a DC-component-removed signal, which is obtained by removing the DC component from the signal from the signal output means and then by smoothing the DC-component-removed signal in such a manner as to substantially follow the peaks of the DC-component-removed signal.

Also, the frequency control means may detect the magnitude of variation in the level of the signal output from the signal output means based on the ratio between the period in which a level of the DC-component-removed signal obtained by removing the DC component from the signal output from the signal output means is greater than a third reference level and the period in which the level of the DC-component-removed signal is smaller than the third reference level.

Vibration of a stator of the ultrasonic motor is detected by the detection means so that a detection signal whose amplitude corresponds to the vibration is output. The signal output means causes the level of an output signal thereof to coincide with the level of the detection signal when the level of the detection signal exceeds the level of the output signal, and lowers the level of the output signal at a decrease rate smaller than a predetermined value when the level of the detection signal is smaller than the level of the output signal. With this operation, when the level of the detection signal varies as illustrated by broken lines in FIGS. 1A through 1D, respectively, the signal output means outputs signals having waveforms illustrated by solid lines in FIGS. 1A through 1D, respectively.

FIG. 1B shows the case where the frequencies of the drive signals are equal to the optimum drive frequency of the ultrasonic motor, and the detection signal includes no irregularity in its waveform and has a constant amplitude. In this state, the signal output from the signal output means maintains its level close to the peaks of the detection signal having the constant amplitude. Also, since the level of the detection signal exceeds the level of the signal output from the signal output means in each period in which the detection signal $V_A$ reaches its positive peak, the magnitude of variation in the level of the output signal is relatively small. The average level of the output signal in this state which will be referred to as "$V_0$", and the magnitude of variation in the level which will be referred to as "do" are compared with corresponding values in other cases.

FIG. 1A shows the case where the frequencies of the drive signals are higher than the drive frequency band, and the detection signal includes no irregularity in its waveform. In this case, the detection signal has a higher frequency and a smaller amplitude compared to the case shown in FIG. 1B. Accordingly, the signal output from the signal output means has a lower average level $V_1$ ($V_1<V_0$), and a smaller magnitude $d_1$ of variation in the level ($d_1<d_0$), compared to the case shown in FIG. 1B. Although not shown in the drawing, the amplitude of the detection signal becomes larger than that in the case shown in FIG. 1B when the frequencies of the drive signals become lower than the frequency in the case shown in FIG. 1B. In this case, the average level of the signal output from the signal output means becomes higher than $V_0$, and the magnitude of variation also becomes larger than $d_0$.

On the other hand, FIGS. 1C and 1D show the cases where irregularity (variation in the amplitude) occurs in the waveform of the detection signal due to generation of an audible sound by the ultrasonic motor. In this case, the level of the output signal varies to follow the large peaks among large and small peaks of the detection signal, unlike the control shown in Japanese Patent Application Laid-open No. 62-203575 in which the level of the output signal varies in the vicinity of the average level of the detection signal. Accordingly, the average levels $V_2$ and $V_3$ of the output signal becomes higher than $V_0$. Also, since the level of the detection signal does not exceed the level of the output signal when the amplitude of the detection signal is small, the level of the output signal is continuously lowered. Accordingly, the magnitudes $d_2$ and $d_3$ also become higher than $d_0$.

Accordingly, in the case where the frequencies of drive signals must be lowered (the case shown in FIG. 1A), the average level of the signal output from the signal output means is low and the magnitude of variation is also small compared to the case where the frequencies of drive signals need not be varied (the case shown in FIG. 1B). Also, in the case where the frequencies of drive signals must be raised (the cases shown in FIGS. 1C and 1D and the above-described case where the frequencies of drive signals are lower than the frequencies in the case shown in FIG. 1B), the average level of the signal output from the signal output means is high and the magnitude of variation becomes large compared to the case where the frequencies of drive signals need not be varied.

As described above, the frequency control means controls the frequencies of the drive signals based on the level of the signal output from the signal output means or the magnitude of variation thereof.

The frequency control means in the invention raises the frequencies of the drive signals when the average level of the signal output from the signal output means is greater than a first reference level, and lowers the frequencies of the drive signals when the average level of the signal output from the signal output means is smaller than the first reference level. As the first reference level, the average level (for example, $V_0$ in FIG. 1) of the signal output from the signal output means when the frequencies of the drive signals are equal to the optimum drive frequency of the ultrasonic motor can be used. Accordingly, when the drive circuit falls in the state where the frequencies of the drive signals must be lowered, the frequencies of the drive signals are lowered based on the average level of the signal output from the signal output means. On the other hand, when the drive circuit falls in the state where the frequencies of the drive signals must be raised, the frequencies of the drive signals are raised based on the average level of the signal output from the signal output means.

In the waveform of the detection signal shown in FIG. 1D, the width D of the pulse is narrow when the amplitude is large. In such a case, the frequency control disclosed in Japanese Patent Application Laid-open No. 6-178556 lowers the frequencies of the drive signals of the ultrasonic motor, thereby leading to generation of a remarkable audible sound, because the period in which the level of the detection signal is greater than a predetermined level is very short. However, the average level $V_3$ of the signal output from the signal output means is higher than the first reference level if $V_0$ is used as the first reference level. Accordingly, in the present invention, the frequencies of the drive signals can be controlled to increase in such a case. Accordingly, even in the case where the level of the detection signal exceeds the predetermined level in a very short time due to the generation of an audible sound in the ultrasonic motor, the ultrasonic motor can be driven without generating a remarkable audible sound.

By way of example, an average value of the level of the above-mentioned signal can be used as the average level of the signal in the present invention. Also, the average level of the signal can be detected based on the ratio between the period in which the level of the signal output from the signal output means is greater than a second reference level and the period in which the level of the signal is smaller than the second reference level. As is apparent from FIGS. 1A and 1B, the level of the signal output from the signal output means varies in a certain variation range, even when no irregularity occurs in the waveform of the detection signal.

Taking the above-described fact into consideration, if the second reference level is set to be equal to the reference level $V_0$ or to be close to the reference level $V_0$, the ratio becomes a constant in the case shown in FIG. 1B. However, the ratio varies when the average level of the output signal varies from $V_0$. In detail, it can be judged that the average level of the output signal is lower than the reference level $V_0$ when the ratio of the period in which the level of the output signal is lower than the second reference level is large. Also, it can be judged that the average level of the output signal is greater than the reference level $V_0$ when the ratio of the period in which the level of the output signal is greater than the second reference level is large. As described above, in the present invention, it is possible to control the frequencies of the drive signals by indirectly judging the average level of the signal as described above without using the averaged value of the level of the signal output from the signal output means as the average level.

The frequency control means raises the frequencies of the drive signals when the magnitude of variation in the level of the signal output from the signal output means is greater than a reference value, and lowers the frequencies of the drive signals when the magnitude of variation in the level of the signal output from the signal output means is smaller than the reference value, based on the above-described fact that in the case where the frequencies of the drive signals must be lowered, the magnitude of variation in the signal output from the signal output means is smaller than that in the case where the frequencies of the drive signals need not be varied, and that in the case where the drive frequencies of the drive signals must be raised, the magnitude of variation in the signal output from the signal output means is greater than that in the case where the frequencies of the drive signals need not be varied.

As the reference value, the magnitude of variation of the signal output from the signal output means (for example, $d_o$ shown in FIG. 1) when the frequencies of the drive signals are equal to the optimum drive frequency of the ultrasonic motor, can be used. With this, the frequencies of the drive signals are lowered based on the magnitude of variation in the signal output from the signal output means in the case where the frequencies of the drive signals must be lowered, and is raised based on the magnitude of variation in the signal output from the signal output means in the case where the frequencies of the drive signals must be raised.

Especially, when the rotational speed of the rotor decreases due to a large load acting on the ultrasonic motor, there is a case where the amplitude of the detection signal becomes small as a whole (resulting in a waveform obtained by reducing the amplitude of the waveform shown in FIG. 1D) even though irregularity occurs in the waveform of the detection signal. In the frequency control shown in Japanese Patent Application Laid-open No. 6-178556, the frequencies of the drive signals are lowered when the above-described detection signal is input, leading to generation of a remarkable audible sound, because the state in which the level of the detection signal is lower than a predetermined level continues.

However, the magnitude $d_3$ of variation in the signal output from the signal output means at this time is greater than the reference value if the reference value is d0. Therefore in the present invention, the frequencies of the drive signals can be controlled to increase in such a case. Accordingly, the Ultrasonic motor can be driven without generating a remarkable audible sound even in the case where the state in which the level of the detection signal is lower than the predetermined level continues when an audible sound is generated in the ultrasonic motor.

The magnitude of variation in the level of the signal in the present invention can be obtained, for example, by detecting the maximum and minimum values of the level of the signal output from the signal output means, and regarding the difference between the detected maximum and minimum values as the magnitude of variation in the level of the signal. Also, the averaged value of the magnitude of variation in the level of the signal output from the signal output means, or a value close to the averaged Value may be used as the magnitude of variation in the level of the signal.

Moreover, the magnitude of variation in the level of the signal can be detected based on the level of a smoothed signal of a DC-component-removed signal, which is obtained by removing the DC component from the signal output from the signal output means, wherein the smoothing is performed to obtain a signal substantially following the peaks of the DC-component-removed signal. Since the level of the signal thus obtained roughly corresponds to the magnitude of variation of the signal which has not been subjected to the removing of the DC component and the smoothing, the magnitude of variation in the level of the signal output from the signal output means can be detected based on the level of the above-described signal.

Also, the magnitude of variation in the level of the signal in the present invention can be detected based on the ratio between the period in which the level of the DC-component-removed signal obtained by removing the DC component from the signal output from the signal output means is greater than a third reference level and the period in which the level of the DC-component-removed signal is smaller than the third reference level, using the same principle as the above-described principle of the present invention.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now described with reference to the accompanying drawings wherein:

FIG. 1A through FIG. 1D are waveform charts for explaining the operation of the present invention wherein FIG. 1A is a waveform chart showing the waveform of an output signal from a signal output means in the case where no irregularity occurs in the waveform of a detection signal and the frequencies of drive signals are higher than a drive frequency band, FIG. 1B is a waveform chart showing the waveform of the output signal from the signal output means in the case where no irregularity occurs in the waveform and the frequencies of the drive signals are equal to an optimum drive frequency, FIG. 1C is a waveform chart showing the waveform of the output signal from the signal output means in the case where irregularity exists in the waveform and the pulse width D of a pulse having a large amplitude is wide, and FIG. 1D is a waveform chart showing the waveform of the output signal from the signal output means in the case where irregularity exists in the waveform and the pulse width D is narrow;

FIG. 4A through FIG. 4C are waveform charts for explaining the operation of the first embodiment wherein FIG. 4A is a waveform chart showing waveforms of respective signals in the case where no irregularity occurs in the waveform of the detection signal, FIG. 1B is a waveform chart showing the waveforms of the respective signals in the case where irregularity exists in the waveform of the detection signal, and FIG. 4C is a waveform chart showing the waveforms of the respective signals in the case where irregularity exists in the waveform of the detection signal and the pulse width D of a pulse having a large amplitude is narrow;

FIG. 11A through FIG. 11C are waveform charts for explaining the operation of the third embodiment wherein FIG. 11A is a waveform chart showing waveforms of respective signals in the case where no irregularity occurs in the waveform of the detection signal, FIG. 11B is a waveform chart showing the waveforms of the respective signals in the case where irregularity exists in the waveform of the detection signal, and FIG. 11C is a waveform chart showing the waveforms of the respective signals in the case where irregularity exists in the waveform of the detection signal and the amplitude of the detection signal is generally small;

FIG. 16 is a graph showing a change in the impedance of the ultrasonic motor with respect to a change in the frequencies of the drive signals, the resonance frequency, the audible sound generating band, the drive frequency band, and the like; and FIG. 17A through FIG. 17C are waveform charts for explaining the problems of the conventional frequency control wherein FIG. 17A is a waveform chart showing waveforms of respective signals in the case where no irregularity occurs in the waveform of the detection signal, FIG. 17B is a waveform chart showing the waveforms of the respective signals in the case where irregularity exists in the waveform of the detection signal, and FIG. 17C is a waveform chart showing the waveforms of the respective signals in the case where irregularity exists in the waveform of the detection signal and the period in which the level of the detection signal is greater than a conventional predetermined level is short.

DETAILED DESCRIPTION OF THE PREFERRED EMBODIMENTS

Embodiments of the present invention will now be described in detail with reference to the drawings.

First Embodiment

Figure 1A:
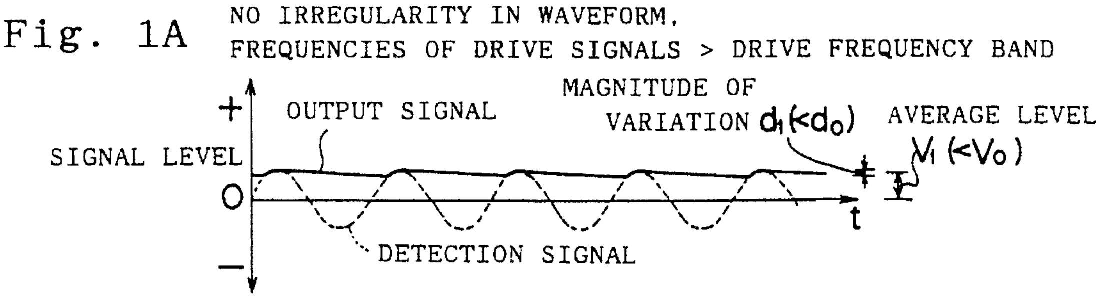
Figure 1B:
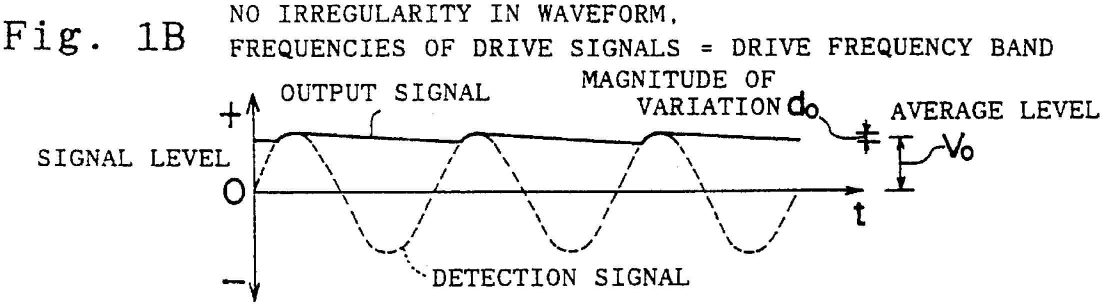
Figure 1C:
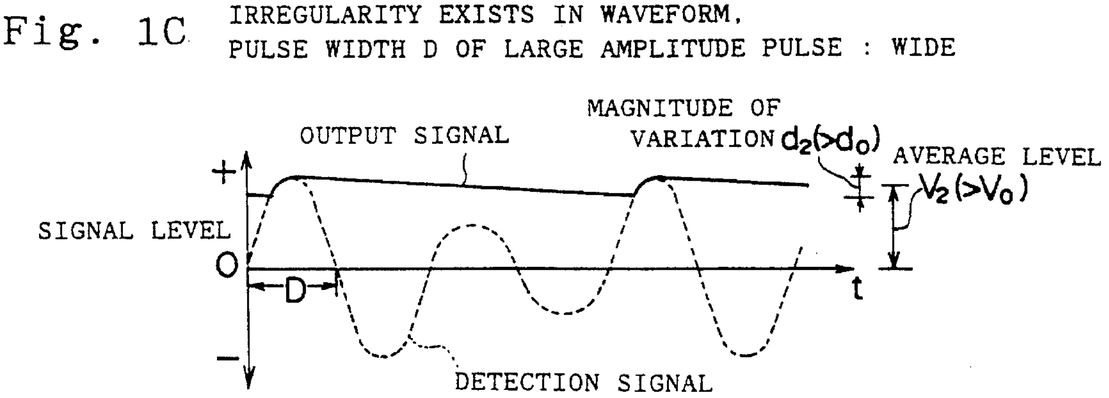
Figure 1D:
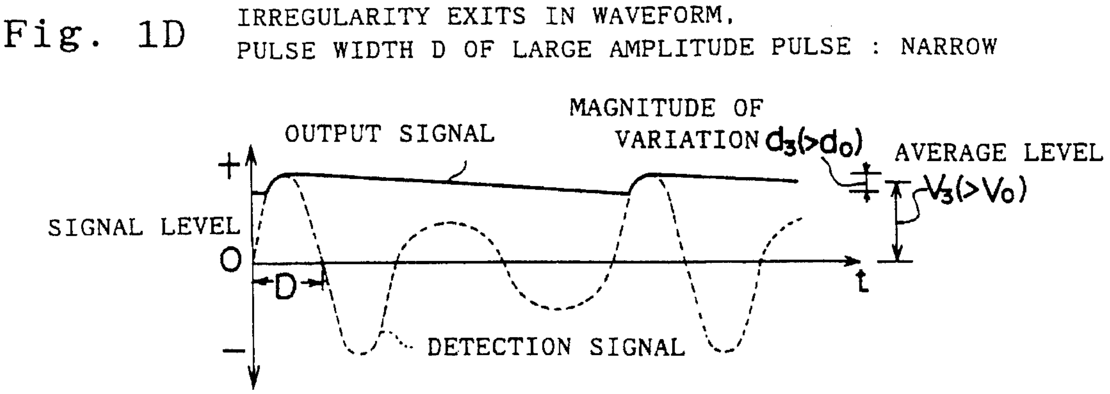
Figure 2:
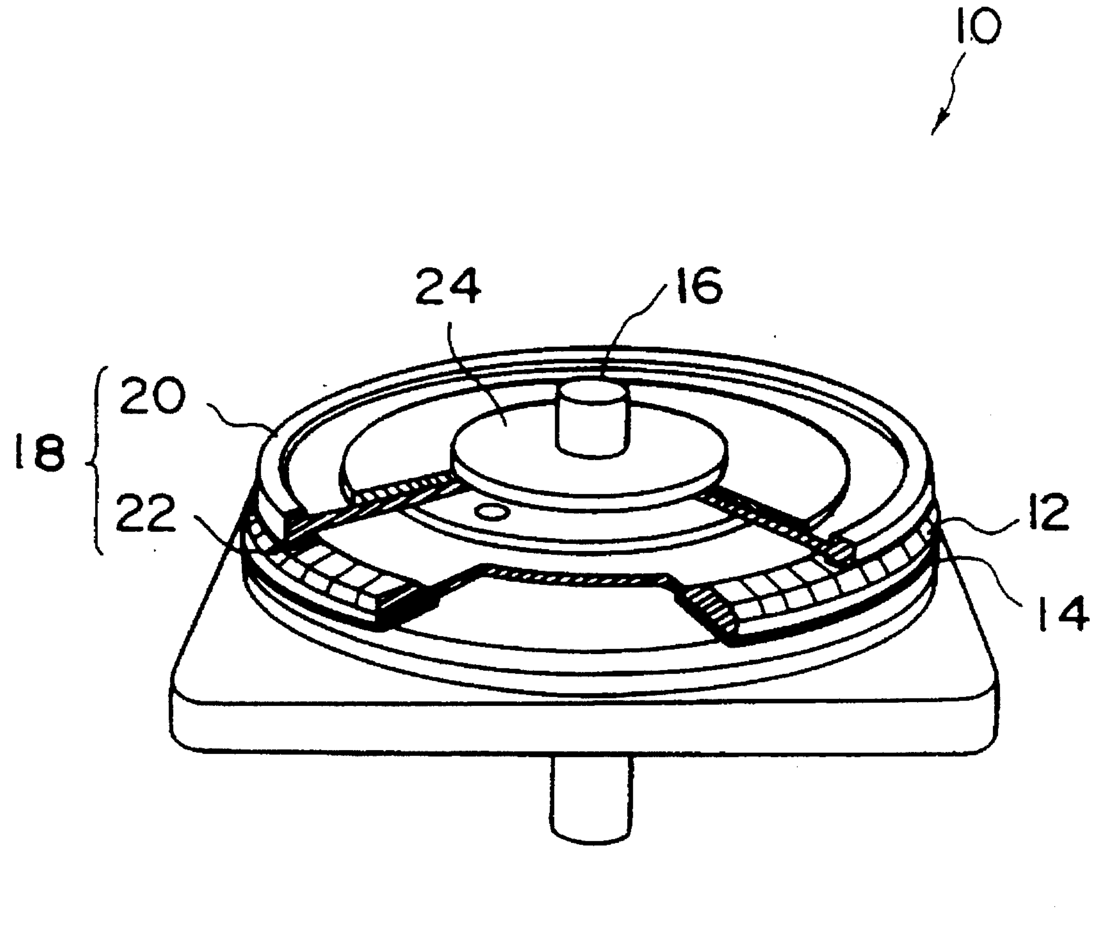
FIG. 2 is a schematic perspective view showing the structure of an ultrasonic motor driven by drive circuits according to the embodiments.

FIG. 2 shows a traveling-wave type ultrasonic motor 10 according to the first embodiment. The ultrasonic motor 10 has an annular elastic body 12 made of a copper alloy or the like, and a piezoelectric body 14 is adhered to the elastic body 12, thereby forming a stator. The piezoelectric body 14 is made of a piezoelectric material which converts electric signals to mechanical vibrations. The piezoelectric body 14 is divided into a plurality of portions arranged in the circumferential direction with a plurality of electrodes being formed thereon.

Figure 3:
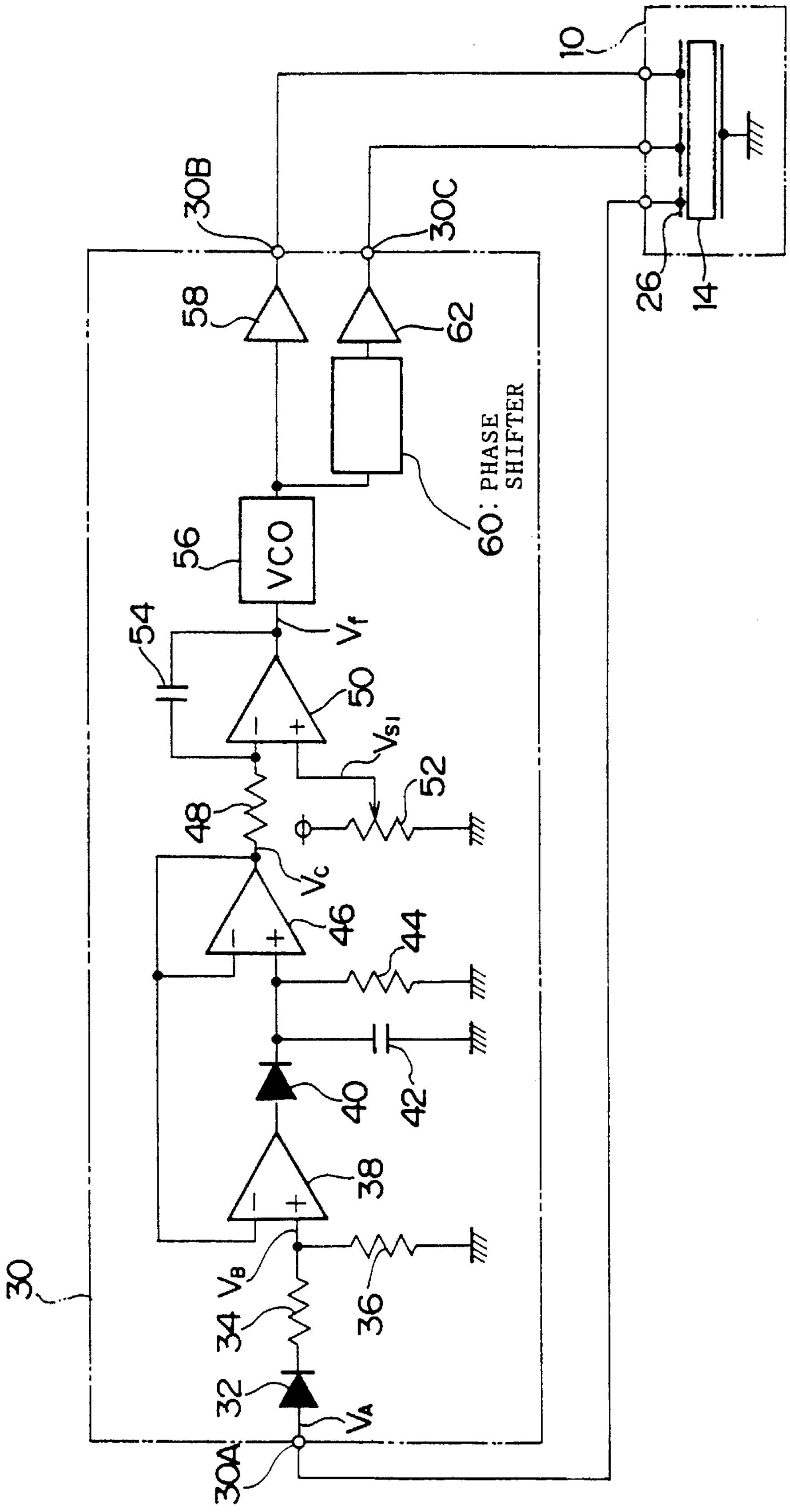
FIG. 3 is a circuit diagram showing an ultrasonic motor drive circuit according to a first embodiment.

A rotor 18 attached to a drive shaft 16 is comprised of a rotor ring 20 made of an aluminum alloy or the like, and an annular slider 22 which is bonded to the rotor ring 20. The slider 22 is urged by a spring 24 against the above-mentioned elastic body 12 so as to contact the elastic body 12. The piezoelectric body 14 is provided with sensor electrode 26 (see FIG. 3). As shown in FIG. 3, the sensor electrode 26 is connected to an input terminal 30A of an ultrasonic motor drive circuit 30 to output thereto an AC signal having an amplitude and a period corresponding to the vibration of the piezoelectric body 14.

The input terminal 30A of the drive circuit 30 is connected to the anode of a diode 32. The cathode of the diode 32 is connected to one end of a resistor 34. The other end of the resistor 34 is connected to one end of a resistor 36 whose other end is grounded, and the non-inverted input terminal of an operational amplifier 38. The output terminal of the operational amplifier 38 is connected to the anode of a diode 40. Connected to the cathode of the diode 40 are one end of a capacitor 42 whose other end is grounded, one end of a resistor 44 whose other end is grounded, and the non-inverted input terminal of the operational amplifier 46. One end of a resistor 48 is connected to the output terminal of the operational amplifier 46.

The output terminal of the operational amplifier 46 is connected to the inverted input terminal of the operational amplifier 46 and the inverted input of the operational amplifier 38. The circuit formed by the operational amplifier 38, the diode 40, the capacitor 42, the resistor 44 and the operational amplifier 46 constitutes the signal output means of the present invention.

Also, the other end of the resistor 48 is connected to the inverted input of an operational amplifier 50. The non-inverted input of the operational amplifier 50 is connected to a power source through a variable resistor 52 so that a first reference voltage $V_{S1}$ is applied to the non-inverted input. One end of a capacitor 54 is connected to the inverted input of the operational amplifier 50 while the other end of the capacitor 54 is connected to the output terminal of the operational amplifier 50. Also, the output terminal of the operational amplifier 50 is connected to a control signal input terminal of a voltage controlled oscillator (VCO) 56. The resistor 48, the operational amplifier 50, the capacitor 54 and VCO 56 form the frequency control means of the present invention. The VCO 56 oscillates at a frequency corresponding to the voltage level of a frequency control signal $V_f$ (see FIG. 4) which is input through the control signal input terminal such that the oscillation frequency is lowered as the voltage level of the input signal becomes higher.

The output terminal of the VCO 56 is branched into two lines, one of which is connected to the input terminal of an amplifier 58 and the other of which is connected to the input terminal of an amplifier 62 via a phase shifter 60. The phase shifter 60 shifts the phase of the input signal by 90 degrees and outputs the shifted signal to the amplifier 62. Accordingly, the amplifiers 58 and 62 are supplied with signals whose frequencies and amplitudes are the same but whose phases differ by 90 degrees from each other. The output terminal of the amplifier 58 is connected to the piezoelectric body 14 of the ultrasonic motor 10 through an output terminal 30B of the drive circuit 30 while the output terminal of the amplifier 62 is connected to the piezoelectric body 14 of the ultrasonic motor 10 through an output terminal 30C of the drive circuit 30.

Operation of the first embodiment will now be described. The VCO 56 of the drive circuit 30 outputs a signal whose frequency corresponds to the voltage level of the frequency control signal $V_f$ input through the control signal input terminal. The signal output from the VCO 56 is divided into two, and the phase of one divided signal is shifted by 90 degrees by the phase shifter 60. These signals are amplified by the amplifiers 58 and 62, respectively, so that two-phase drive signals, i.e., a sine-wave drive signal and a cosine-wave drive signal are generated and supplied to the piezoelectric body 14 of the ultrasonic motor 10. With this operation, an ultrasonic vibration is produced in the piezoelectric body 14 so that traveling wave is excited in the elastic body 12, whereby the drive shaft and the rotor 18 are rotated.

Meanwhile, as shown in FIGS. 4A–4C, an AC detection signal $V_A$ having an amplitude and a frequency corresponding to the vibration of the piezoelectric body 14 is output from the sensor electrode 26 of the piezoelectric body 14 and is input to the drive circuit 30 through the input terminal 30A. The detection signal $V_A$ input to the drive circuit 30 is subjected to half-wave rectification by the diode 32 and potential division by the resistors 34 and 36 to obtain a signal $V_B$, which is then input to the operational amplifier 38. When the voltage level of the signal $V_B$ sinusoidally varies, the polarity at the output terminal of the operational amplifier 38 becomes positive in accordance with the variation in the voltage level of the signal $V_B$ so that the capacitor 42 is charged by current flowing through the diode 40 at a considerably small time constant. The charged voltage of the capacitor 42 increases as the voltage level of the signal $V_B$ increases, and becomes the maximum when the signal $V_B$ reaches a peak of the sinusoidal variation.

When the voltage level of the signal $V_B$ starts to decrease after passing a peak of the sinusoidal variation, the charging of the capacitor 42 is stopped, and a reverse bias is applied to the diode 40. In this state, the charge accumulated in the capacitor 42 is gradually discharged through the resistor 44. The time constant t of the discharge is expressed as follows:

$$t = C1 \times R1 \quad (1)$$

where C1 represents the capacitance of the capacitor 42, and R1 represents the resistance of the resistor 44. Since the operational amplifier 46 cooperates with the operational amplifier 38 to operate as a voltage follower, the voltage level of the signal $V_C$ output from the operational amplifier 46 is equal to the voltage between both ends of the capacitor 42. Accordingly, when the charge in the capacitor 42 is gradually discharged, the voltage level of the signal $V_C$ varies in accordance with the following expression (2):

$$V_C = V_P\, e^{\frac{-t}{C1 \cdot R1}} \quad (2)$$

so that the voltage level gradually decreases as shown in FIG. 4A through FIG. 4C.

The signal $V_C$ output from the operational amplifier 46 is input to the operational amplifier 50 through the resistor 48. Since the resistor 48, the operational amplifier 50 and the capacitor 54 form an integration circuit, the voltage levels of the frequency control signal $V_f$ output from the operational amplifier 50 is expressed by the following expression (3):

$$V_f = -\frac{1}{C2 \cdot R2} \int (V_C - V_S)\, dt + V_S \quad (3)$$

where C2 represents the capacitance of the capacitor 54, and R2 represents the resistance of the resistor 48. Accordingly, the variation in the voltage level of the signal $V_f$ represents the results of comparison between the average voltage level of the signal $V_C$ (in accurate, the voltage level of the signal obtained by smoothing the signal $V_C$) and the first reference voltage $V_{S1}$. When the voltage level of the signal $V_C$ is higher than the first reference voltage $V_{S1}$, the voltage level of the signal $V_f$ gradually decreases. When the voltage level of the signal $V_C$ is equal to the first reference voltage $V_{S1}$, the voltage level of the signal $V_f$ does not vary. When the voltage level of the signal $V_C$ is lower than the first reference voltage $V_{S1}$, the voltage level of the signal $V_f$ gradually increases. This frequency control signal $V_f$ is input to the VCO 56 so that the oscillation frequency of the VCO 56 (i.e., the frequencies of the drive signals) is varied in accordance with the variation of the voltage level of the frequency control signal $V_f$.

Figure 16:
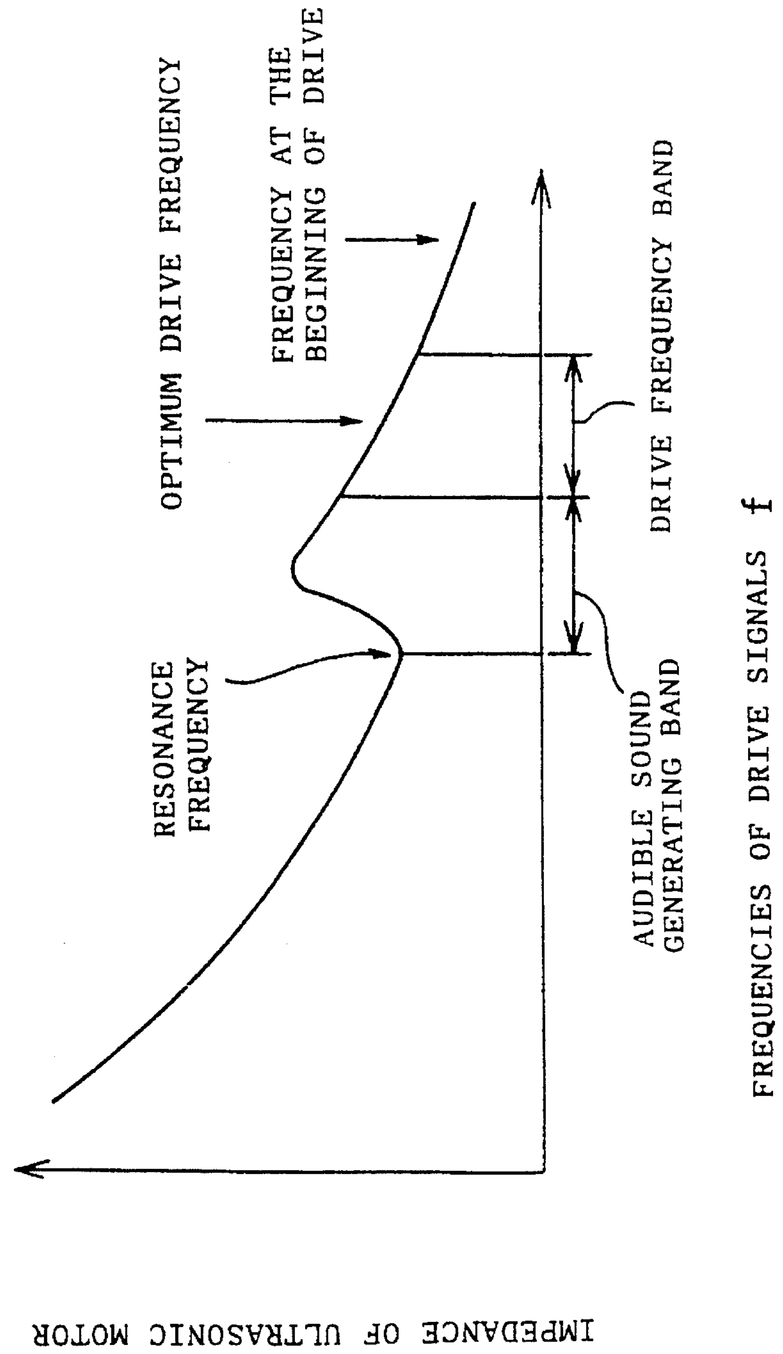

With the above-described operation, when the frequencies of the drive signals of the ultrasonic motor are higher than the drive frequency band of the ultrasonic motor 10 (for example, the "frequency at the beginning of drive" shown in FIG. 16), the amplitude of the detection signal $V_A$ output from the sensor electrode 26 is small. In such case, the voltage level of the signal $V_C$ output from the operational amplifier 46 never exceeds the first reference voltage $V_{S1}$ so that the frequency control signal $V_f$ continuously increases. Accordingly, the oscillation frequency of the VCO 56 (the frequencies of the drive signals) is gradually lowered.

Also, when the frequencies of the drive signals approach the optimum drive frequency of the ultrasonic motor 10, the detection signal $V_A$ has constant magnitude and a proper amplitude, as shown in FIG. 4A. In this case, the signal $V_C$ varies to approximately follow the peaks of the signal $V_B$, and the level of the signal $V_C$ properly varies. Accordingly, the average voltage level of the signal $V_C$ becomes roughly equal to the first reference voltage $V_{S1}$. Therefore, the frequency control signal $V_f$ maintains a substantially constant voltage level so that the frequencies of the drive signals are maintained at a frequency close to the optimum drive frequency.

When the optimum drive frequency of the ultrasonic motor 10 varies due to a variation in the ambient temperature or a variation in the load acting on the ultrasonic motor 10 and the amplitude of the detection signal $V_A$ varies accordingly without the occurrence of irregularity in the waveform thereof, the difference between the average voltage level of the signal $V_C$ and the first reference voltage $V_{S1}$ exceeds a predetermined value. In this case, the frequencies of the drive signals are controlled such that the average voltage level of the signal $V_C$ coincides with the first reference voltage $V_{S1}$, i.e., such that the frequencies of the drive signals vary (increase or decrease) to follow the varying optimum drive frequency of the ultrasonic motor 10.

When the frequencies of the drive signals enters the audible sound generating band of the ultrasonic motor 10, irregularity as shown in FIG. 4B occurs in the waveform of the detection signal $V_A$ so that the period and the amplitude of the detection signal fluctuate. Also, depending on the amplitudes and frequencies of the drive signals and the load acting on the ultrasonic motor 10, the pulse width D becomes small when the amplitude of the detection signal $V_A$ becomes large, as shown in FIG. 4C. In the waveform shown in FIG. 4C, each period in which the detection signal $V_A$ is greater than the predetermined level is very short. Accordingly, in the conventional frequency control, the frequencies of the drive signals of the ultrasonic motor are lowered so that a remarkable audible sound is generated.

In the present embodiment, when irregularity occurs in the waveform of the detection signal $V_A$, the voltage level of the signal $V_C$ varies to follow the large peaks among the large and small peaks of the detection signal $V_A$. Accordingly, the state in which the voltage level of the signal $V_C$ is higher than the first reference voltage $V_{S1}$ continues in both the cases shown in FIG. 4B and FIG. 4C, so that the frequency control signal $V_f$ is controlled to gradually decrease in both cases. With this operation, the frequencies of the drive signals are controlled to gradually increases or to return from the audible sound generating band to the drive frequency band, thereby preventing the ultrasonic motor 10 from generating a remarkable audible sound.

To obtain the signal $V_C$ having the waveform shown in FIG. 4 upon the occurrence of irregularity in the waveform of the detection signal $V_A$, the voltage level of the signal $V_C$ must be made higher than the voltage level of the signal $V_B$ when a small amplitude occurs in the signal $V_B$. This operation can be achieved by increasing the value of the time constant t so as to make the decrease speed of charged voltage of the capacitor 42 at the time of discharging the capacitor 42, i.e., the decrease speed of the voltage level of the signal ($V_C$) output from the signal output means, smaller than a predetermined value.

Figure 5:
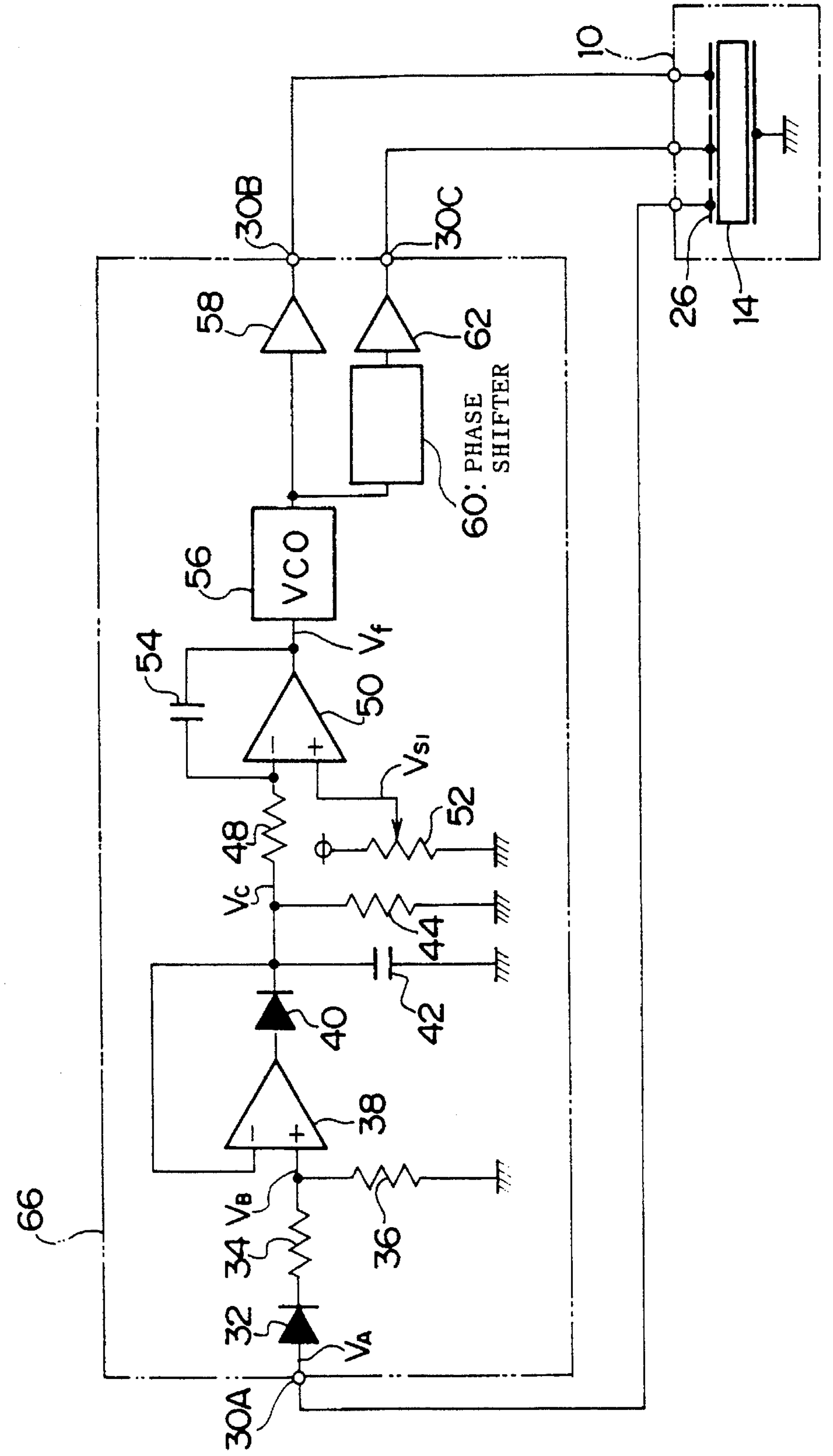
FIG. 5 is a circuit diagram of an ultrasonic motor drive circuit showing another structure of the signal output means.

The signal output means according to the present invention is not limited to the structure shown in FIG. 3, and may have the structure shown in FIG. 5. In the drive circuit 66 shown in FIG. 5, the operational amplifier 46 serving as a voltage follower is removed from the signal output means shown in FIG. 3. Therefore, the signal output means is formed by the operational amplifier 38, the diode 40, the capacitor 42 and the resistor 44. When the signal output means is designed in this way, the voltage level of the signal $V_C$ varies in the same way as in the circuit shown in FIG. 3 although the stability of the voltage level of the signal $V_C$ slightly decreases. Accordingly, the drive signals can be controlled in the same manner as in the example shown in FIG. 3. In addition, costs can be reduced because the operational amplifier 46 can be omitted.

Figure 6:
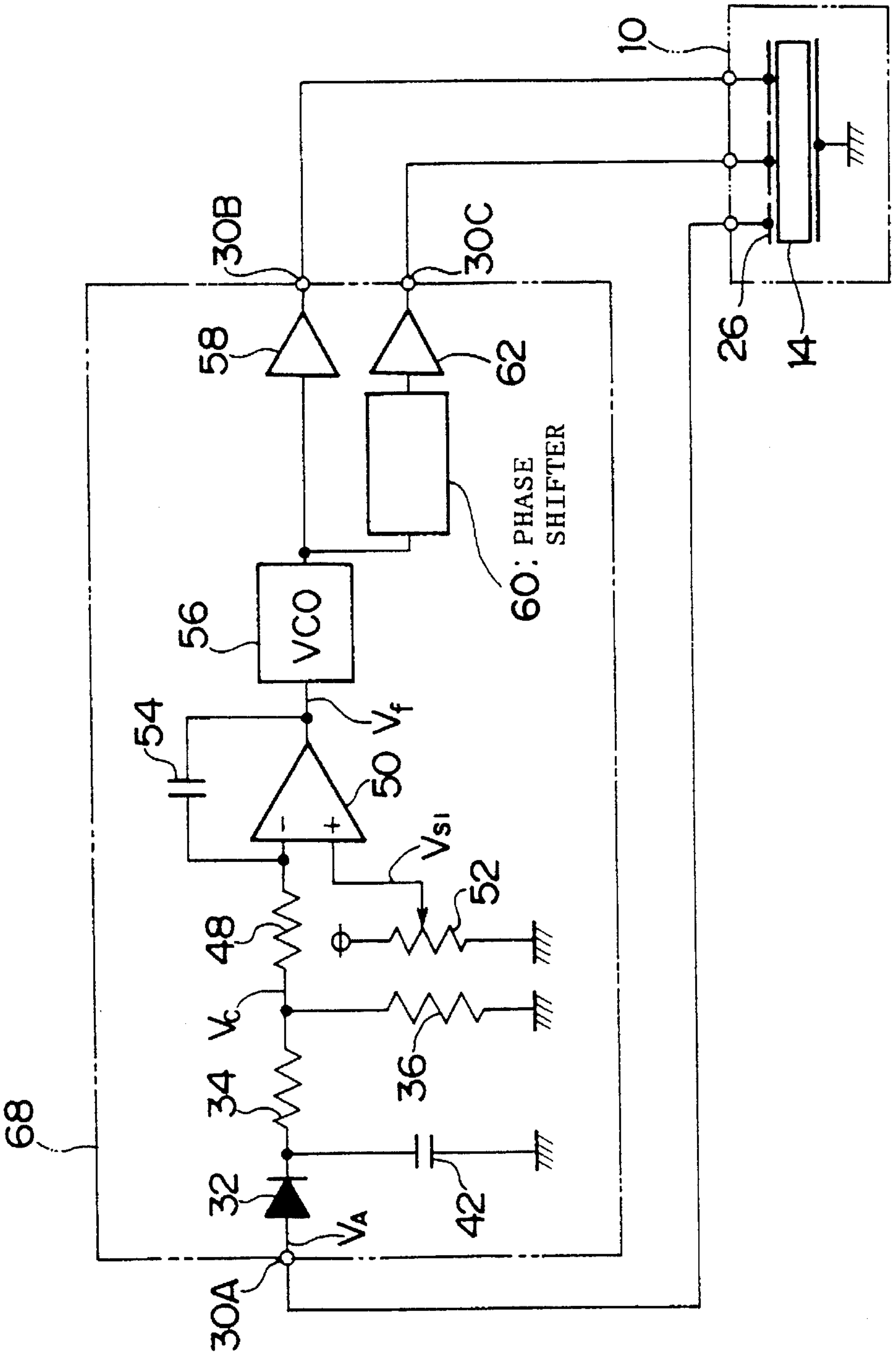
FIG. 6 is a circuit diagram of an ultrasonic motor drive circuit showing another structure of the signal output means.

Also, the signal output means may have the structure shown in FIG. 6. In the drive circuit 68 shown in FIG. 6, the operational amplifier 38 is further omitted from the signal output means shown in FIG. 5, and the cathode of the diode 32 is connected to one end of the capacitor 42 whose other end is grounded, and to one end of the resistor 34. The other end of the resistor 34 is connected to one end of the resistor 36 whose other end is grounded. Moreover, one end of the resistor 48 is connected to the other end of the resistor 34. The resistor 48 serves as an input terminal of an integration circuit formed by the resistor 48, the operational amplifier 50 and the capacitor 54.

In the drive circuit 68, the diode 32 provides both the function of the diode 32 and the function of the diode 40 in the drive circuit 30 so that the signal output means of the present invention is formed by the diode 32, the capacitor 42 and the resistors 34 and 36. The time constant t of the discharge at the time of discharging the capacitor 42 is expressed as follows:

$$t=C1\times(R1+R2)$$

where C1 represents the capacitance of the capacitor 42, and R1 and R2 represent the resistances of the resistors 34 and 36, respectively. Accordingly, the voltage $V_C$ shown in FIG. 4A through 4C are input to the integration circuit. Although the stability of the voltage level of the signal $V_C$ in the signal output means of the drive circuit 68 is lower than that in the signal output means of the above-described drive circuit 66, the costs can be reduced much more because the operational amplifier 38 can be omitted.

The frequency control means of the above-described drive circuits raise the frequencies of the drive signals when the average level of the signal substantially output from the signal output means is greater than a first reference level (the first reverence voltage $V_{S1}$) and lowers the frequencies of the drive signals when the average level of the signal is smaller than the first reference level (the first reverence voltage $V_{S1}$). However, the frequency control means is not limited thereto, and may have the structure shown in FIG. 7.

Figure 7:
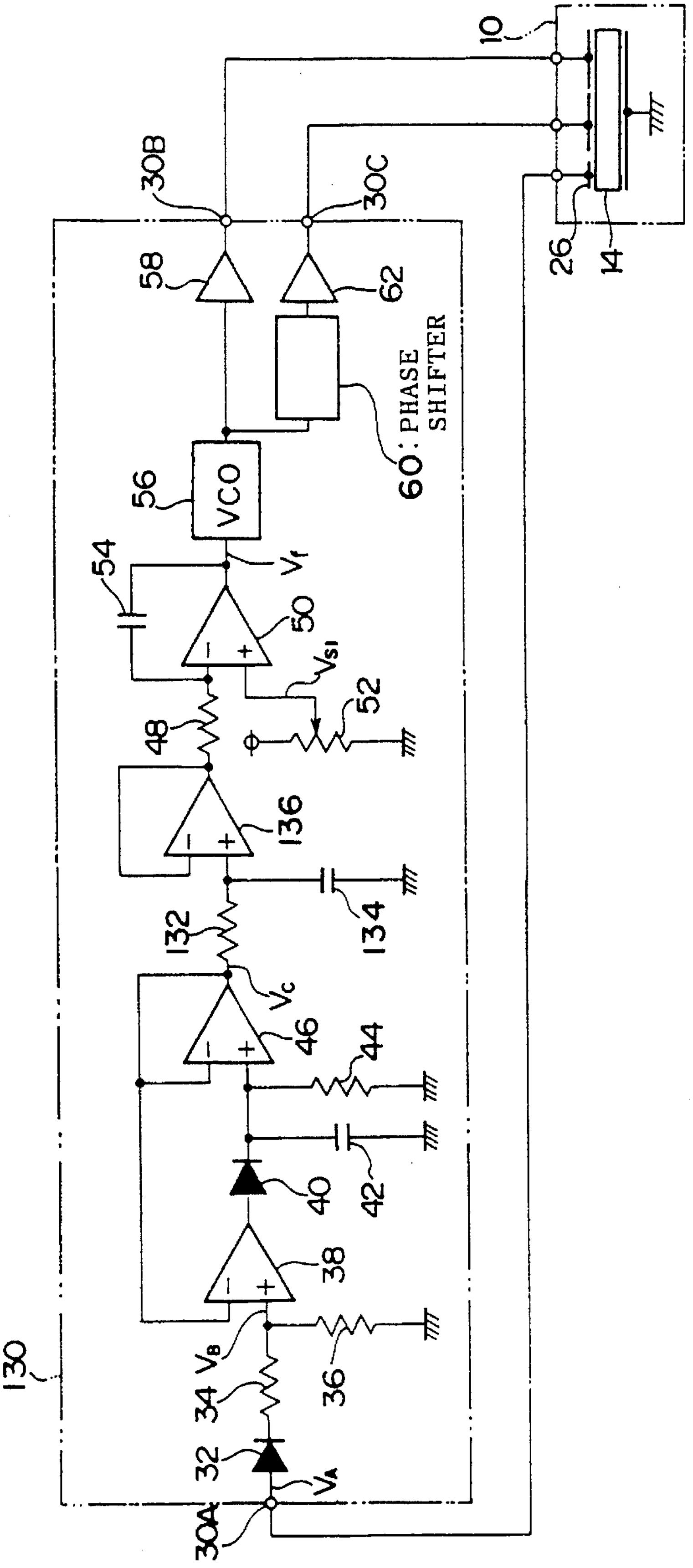
FIG. 7 is a circuit diagram of an ultrasonic motor drive circuit showing another structure of the frequency control means.

In the drive circuit 130 shown in FIG. 7, an average value detection circuit including a resistor 132, a capacitor 134 and an operational amplifier 136 is provided between the signal output means and the frequency control means. One end of the resistor 132 is connected to the output terminal of the operational amplifier 46, while the other end of the resistor 132 is connected to one end of the capacitor 134, whose other end is grounded, and to the non-inverted terminal of the operational amplifier 136. The inverted input terminal of the operational amplifier 136 is connected to the output terminal of the amplifier 136, and the output terminal of the amplifier 136 is connected to one end of the resistor 48.

The resistor 132 and the capacitor 134 form an integration circuit (hereinafter referred to as the first integration circuit) which averages the voltage level of the signal $V_C$. Since the operational amplifier 136 serves as a voltage follower, the voltage level of a signal output from the operational amplifier 136 is equal to the voltage between both ends of the capacitor 134. Accordingly, a signal having a voltage level substantially equal to the average value of the signal $V_C$ is output from the operational amplifier 136. Accordingly, although the circuit becomes slightly complex, the voltage level of the signal $V_C$ can be input to the integration circuit formed by the resistor 48, the capacitor 54 and the operational amplifier 50 (hereinafter referred to as the second integration circuit) after being averaged. By the synergetic effect with the smoothing function provided by the second integration circuit, the frequencies of the drive signals can be controlled based on the results of the comparison between the value which is very close to the average value of the signal $V_C$ and the first reference voltage $V_{S1}$.

As described above, the frequency control means may be formed by detection means for detecting the average value of the level of the signal output from the signal output means, and control means for raising the frequencies of the drive signals when the average value detected by the detection means is greater than a first reference level (the first reverence voltage $V_{S1}$) and for lowering the frequencies of the drive signals when the average value is smaller than the first reference level (the first reverence voltage $V_{S1}$).

Second Embodiment

Figure 8:
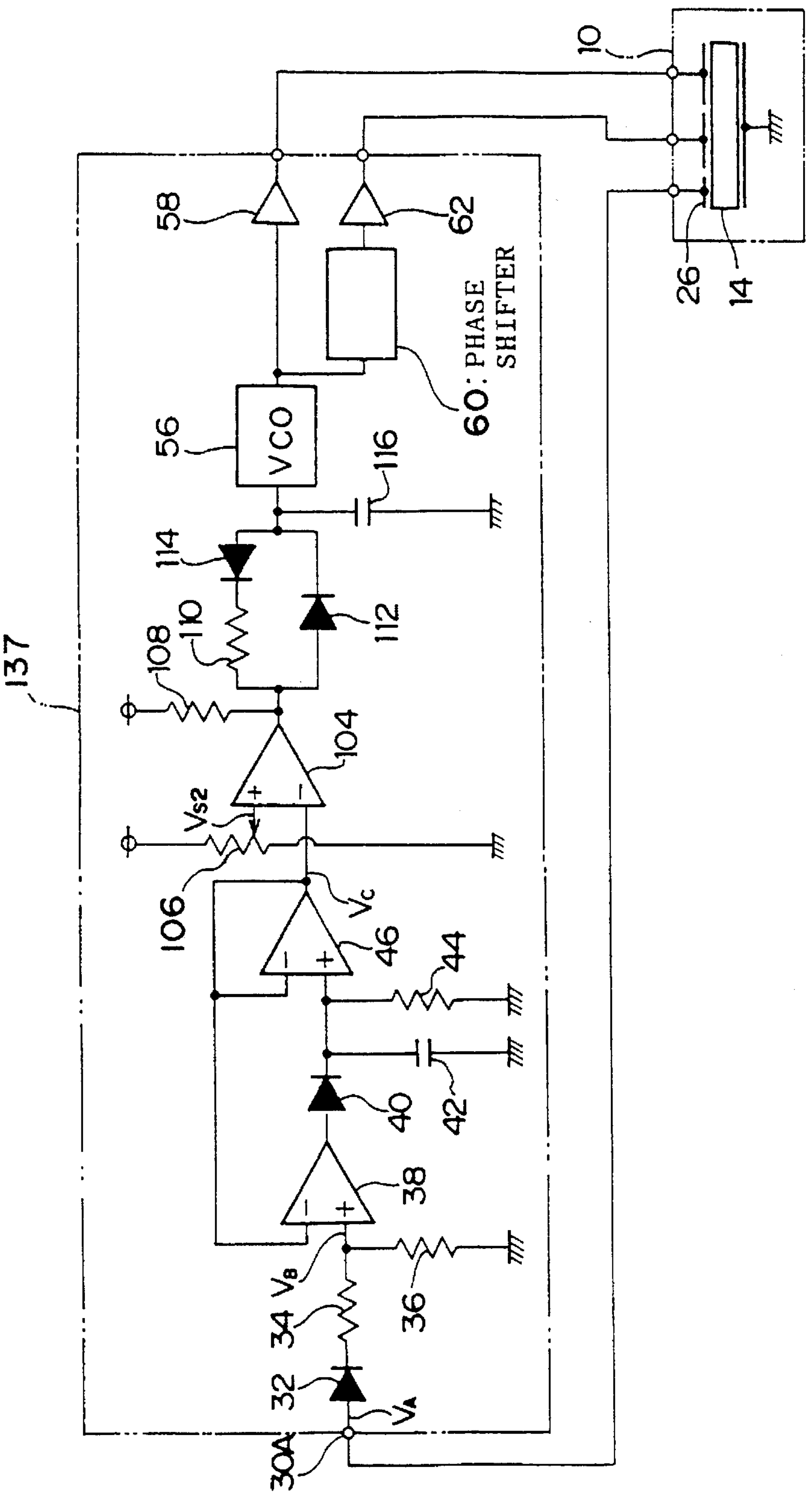
FIG. 8 is a circuit diagram of an ultrasonic motor drive circuit according to a second embodiment.

Next, the second embodiment of the present invention will be described. Since the second embodiment is the same as the first embodiment except the structure of the drive circuit, the drive circuit of the second embodiment will be described, focusing on portions different from the drive circuit 30. Description of other portions will be omitted. As shown in FIG. 8, in a drive circuit 137 according to the second embodiment, the non-inverted input of the comparator 104 is connected to the output terminal of the operational amplifier 46 which forms a part of the signal output means. The non-inverted input terminal of the comparator 104 is connected to the power source through a variable resistor 106 so that a second reference voltage $V_{S2}$ is applied to the non-inverted input through the variable resistor 106.

The output terminal of the comparator 104 is connected to one end of a resistor 108, whose one end is connected to the power source, one end of a resistor 110, and the anode of a diode 112. The other end of the resistor 110 is connected to the cathode of the diode 114. The anode of the diode 114 and the cathode of the diode 112 are connected to the control signal input terminal of the VCO 56. Also, one end of a capacitor 116 is connected between the anode of the diode 114 and the cathode of the diode 112, and the control signal input terminal of the VCO 56, while other end of the capacitor 116 is grounded.

Next, the operation of the second embodiment will be described. The signal $V_C$ output from the operational amplifier 46 is input to the comparator 104. In the second embodiment, the average level of the signal output from the signal output means is detected based on the ratio between the period in which the level of the signal output from the signal output means is greater than a second reference level (a second reference voltage $V_{S2}$) and the period in which the level of the signal is smaller than the second reference level (the second reference voltage $V_{S2}$).

In detail, the voltage level of the signal $V_C$ input to the inverted input terminal of the comparator 104 is compared with the second reference voltage $V_{S2}$ input to the non-inverted input terminal. When the level of the signal $V_C$ is lower than the second reference voltage $V_{S2}$, a signal of a high level is output from the comparator 104. When the output signal from the comparator 104 is high, current flows to the capacitor 116 through the diode 112 so that the capacitor 116 is gradually charged. Accordingly, the voltage between both ends of the capacitor 116 (the voltage level of the frequency control signal $V_f$) gradually increases so that the oscillation frequency of the VCO 56 is gradually lowered. The charging speed of the capacitor 116 in this state depends on the resistance of the resistor 108. Accordingly, the charging speed is fast when the resistance of the resistor 108 is small, and the charging speed is slow when the resistance of the resistor 108 is high.

When the level of the signal $V_C$ input to the inverted input of the comparator 104 is higher than the second reference voltage $V_{S2}$, the output signal from the comparator 104 becomes low. Accordingly, the charge accumulated in the capacitor 116 is discharged through the diode 114 and the resistor 110 so that the voltage between both ends of the capacitor 116 (the voltage level of the frequency control signal $V_f$) gradually decreases. The discharging speed of the capacitor 116 in this state depends on the resistance of the resistor 110. Accordingly, the charging speed is fast when the resistance of the resistor 110 is small, and the discharging speed is slow when the resistance of the resistor 110 is high.

In the second embodiment, the resistances of the resistors 108 and 110 are determined such that when the frequencies of the drive signals are close to the optimum drive frequency, the decrease amount of the voltage level of the frequency control signal $V_f$ during the period in which the voltage level of the signal $V_C$ is greater than the second reference voltage $V_{S2}$ becomes equal to the increase amount of the voltage level of the frequency control signal $V_f$ during the period in which the voltage level of the signal $V_C$ is lower than the second reference voltage $V_{S2}$ so that the voltage level of the frequency control voltage $V_f$ is maintained substantially constant.

With the above-described determination of the resistances, the drive circuit operates. When the ratio of the period in which the voltage level of the signal $V_C$ is greater than the second reference voltage $V_{S2}$ is larger than that in the state in which the frequencies of the drive signals are equal to the optimum drive frequency of the ultrasonic motor (i.e., the average voltage level of the signal $V_C$ is high), the voltage level of the frequency control signal is gradually lowered to gradually increase the frequencies of the drive signals of the ultrasonic motor. When the ratio of the period in which the voltage level of the signal $V_C$ is lower than the second reference voltage $V_{S2}$ is larger than that in the state in which the frequencies of the drive signals are equal to the optimum drive frequency of the ultrasonic motor (i.e., the average voltage level of the signal $V_C$ is low), the voltage level of the frequency control signal is gradually raised to gradually decrease the frequencies of the drive signals of the ultrasonic motor.

Accordingly, the frequencies of the drive signals are maintained at a frequency close to the optimum drive frequency so that the ultrasonic motor can be driven without generating a remarkable audible sound even in the case where the period during which the level of the detection signal exceeds a predetermined level due to the generation of an audible sound in the ultrasonic motor is very short. As described above, the frequency control means may be designed to obtain the ratio between the period in which the level of the signal output from the signal output means is greater than the second reference level (the second reference voltage $V_{S2}$) and the period in which the level of the signal is smaller than the second reference level (the second reference voltage $V_{S2}$), and to increase the frequencies of the drive signals when the ratio is greater than a predetermined value, and decrease the frequencies of the drive signals when the ratio is lower than the predetermined value.

In the case of using an operational amplifier instead of the comparator 104, a resistor 108 is connected between the operational amplifier and the anode of the diode 112. This structure allows the drive circuit to operate in a similar manner as the drive circuit 137.

Third Embodiment

Figure 9:
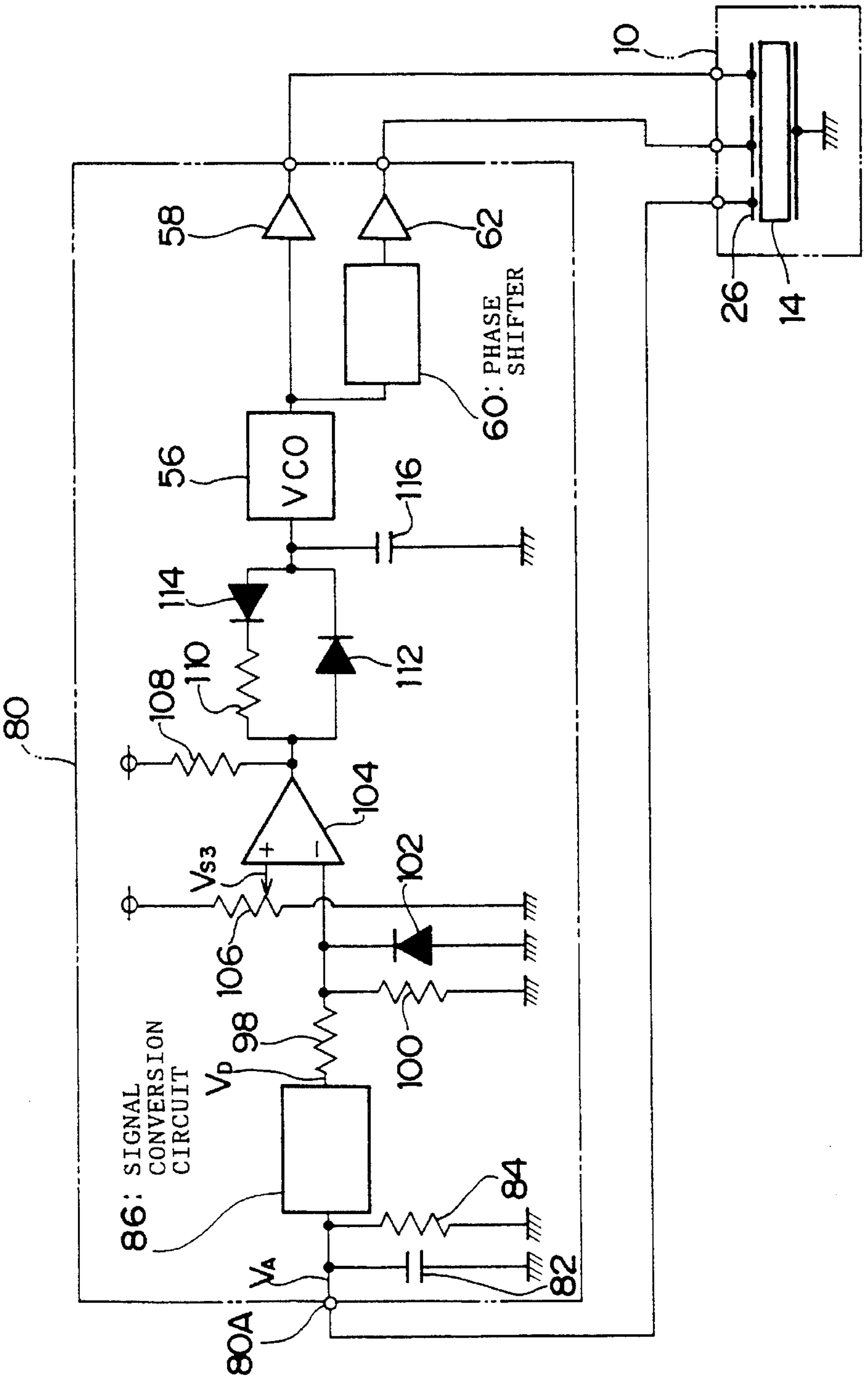
FIG. 9 is a circuit diagram of an ultrasonic motor drive circuit according to a third embodiment.

Next the third embodiment will be described. Same portions as those in the first and second embodiments are represented by the same reference symbols, and description therefor will be omitted. FIG. 9 shows a drive circuit 80 according to the third embodiment. To an input terminal 80A of the drive circuit 80 which is connected to the sensor electrode 26 of the ultrasonic motor 10 so as to input the detection signal $V_A$, one end of a capacitor 82 and one end of a resistor 84 are connected, while the other end of the capacitor 82 and the other end of the resistor 84 are grounded. The capacitor 82 and the resistor 84 are provided for eliminating noise on the detection signal $V_A$, and both or any one of them may be omitted. The input terminal 80A is connected to an input terminal 86A of a signal conversion circuit 86 (see FIG. 10).

Figure 10:
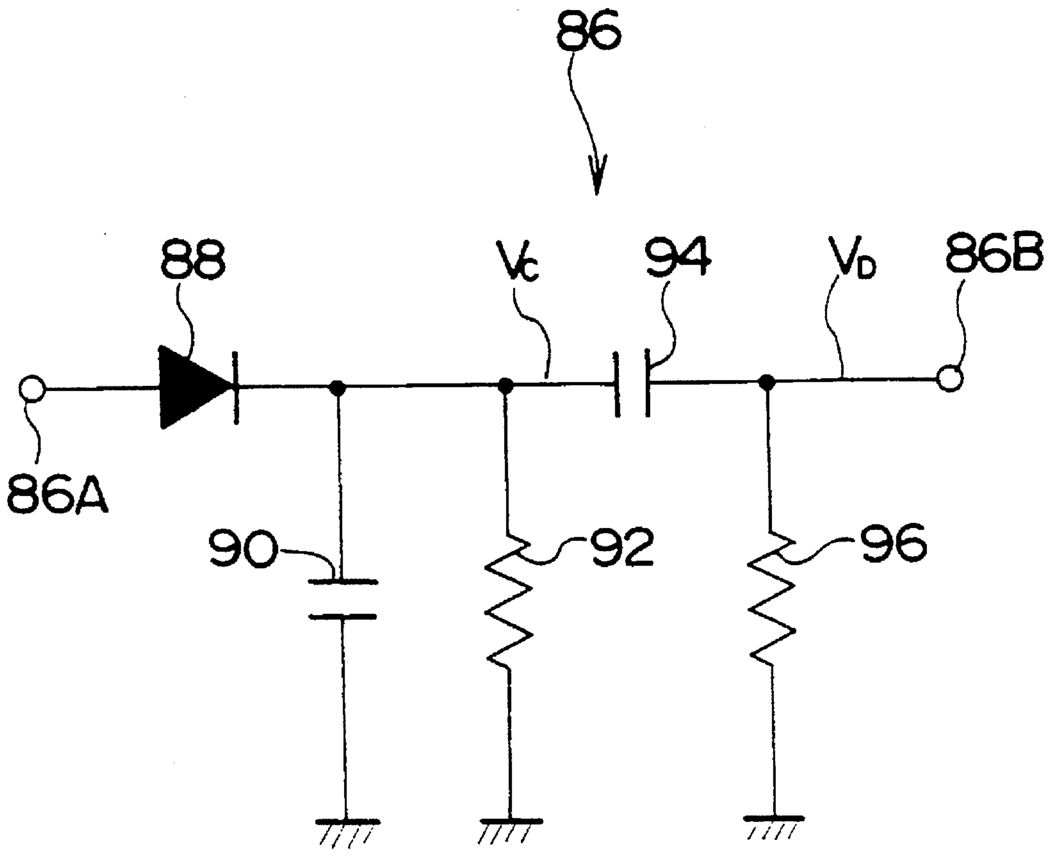
FIG. 10 is a circuit diagram showing the signal conversion circuit according to the third embodiment.

As shown in FIG. 10, the anode of a diode 88 is connected to the input terminal 86A of the signal conversion circuit 86. Connected to the cathode of the diode 88 are one end of a capacitor 90, one end of a resistor 92 and one end of a capacitor 94. The other end of the capacitor 90 and the other end of the resistor 92 are both grounded, and the other end of the capacitor 94 is connected to one end of a resistor 96, whose other end is grounded, and is connected to an output terminal 86B of the signal conversion circuit 86. The output terminal 86B of the signal conversion circuit 86 is connected to one end of a resistor 98.

Connected to the other end of the resistor 98 are one end of a resistor 100, whose other end is grounded, and the cathode of a diode 102, whose anode is grounded. To the other end of the resistor 98, the inverted input of a comparator 104 is also connected. The diode 102 is provided to prevent the application of a negative voltage to the inverted input of the comparator 104, thereby protecting the comparator 104. The non-inverted input of the comparator 104 is connected to the power source through a variable resistor 106 so that a third reference voltage $V_{S3}$ is applied to the non-inverted input through the variable resistor 106. The output terminal of the comparator 104 is connected to the control signal input terminal of a VCO 56 via a circuit similar to the drive circuit 137 of the second embodiment.

Next, the operation of the third embodiment will be described. When the ultrasonic motor 10 is driven, the detection signal $V_A$ output from the sensor electrode 26 is input to the drive circuit 80 via the input terminal 80A. The detection signal $V_A$ is input to the signal conversion circuit 86 after noise is removed therefrom by the capacitor 82 and the resistor 84. The diode 88, the capacitor 90 and the resistor 92 of the signal conversion circuit 86 serve as the signal output means of the invention, like the diode 32, the capacitor 42 and the resistor 34 in the above-described drive circuit 68 (see FIG. 6).

Figures 11A, 11B, 11C:
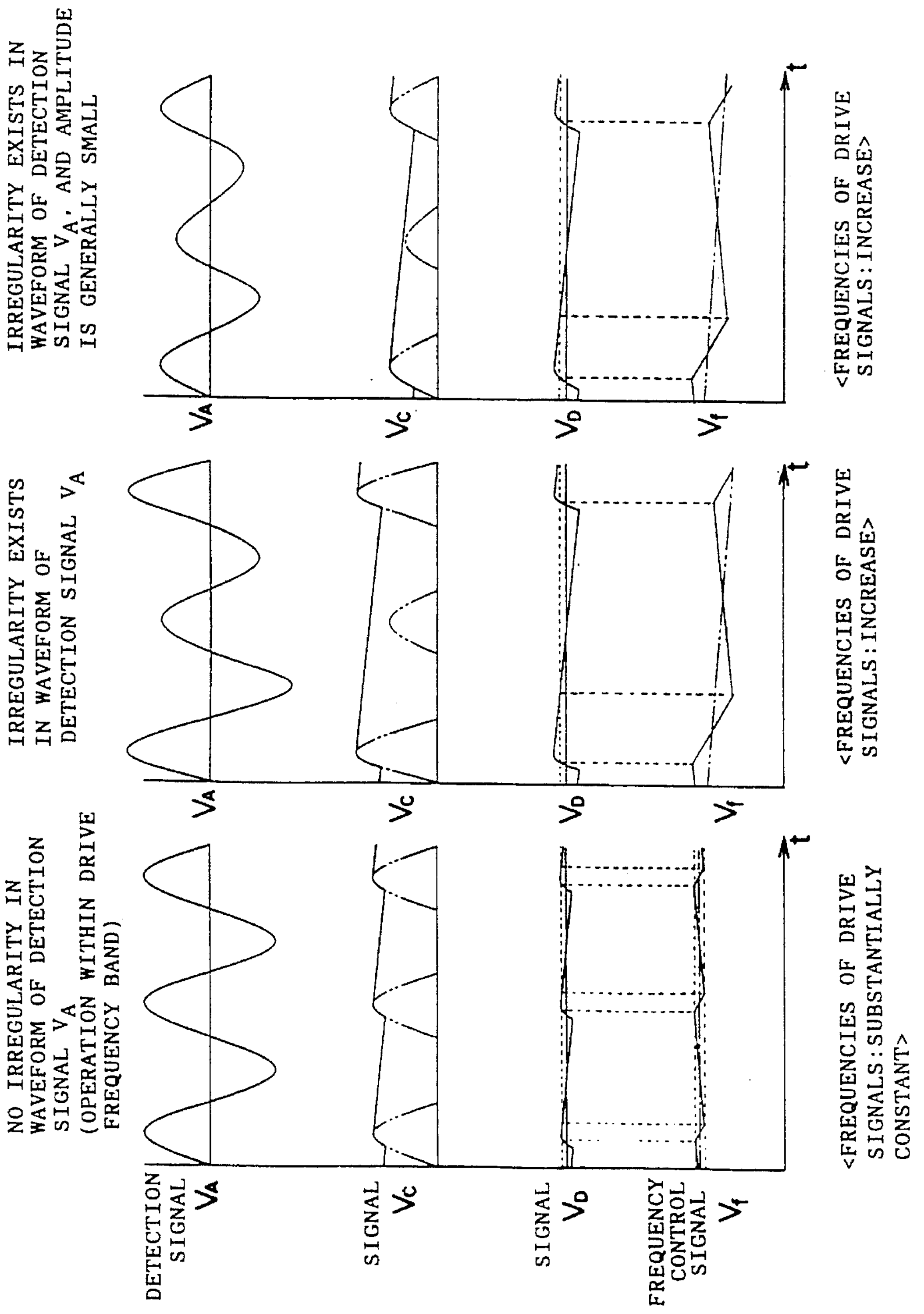

Accordingly, the detection signal $V_A$ is subjected to half-wave rectification by the diode 88, as shown by an imaginary line in FIG. 11A through FIG. 11C. When the voltage level of the rectified signal is higher than the charged voltage of the capacitor 90, the capacitor 90 is charged at a small time constant. When the voltage level of the rectified signal starts to decrease after passing a peak of a sinusoidal variation, the charging of the capacitor 90 is stopped, and the charge accumulated in the capacitor 90 is gradually discharged through the resistor 92. Accordingly, the voltage between both ends of the capacitor 90 varies as illustrated in FIG. 11A through FIG. 11C as variations of the signal $V_C$.

The capacitor 94 and the resistor 96 form a differential circuit which is a part of the frequency control means of the present invention. Since the differential circuit is designed to have a relatively large time constant, the DC component is removed from the signal $V_C$ as shown in FIG. 11A through FIG. 11C as the signal $V_D$ so that a signal representing the AC component (variable component) of the signal $V_C$ is output from the differential circuit. As described above, the magnitude of variation in the level of the signal output from the signal output means can be extracted by removing the DC component from the signal. The signal $V_D$ output from the signal conversion circuit 86 undergoes potential division by the resistors 98 and 100, and the divided voltage is input to the comparator 104 after the negative portion thereof is cut by the diode 102.

In the third embodiment, the magnitude of variation in the level of the signal $V_C$ is detected based on the ratio between the period in which the level of the DC-component-removed signal $V_D$ which is obtained by removing the DC component from the signal $V_C$ is greater than a third reference voltage $V_{S3}$ and the period in which the level of the DC-component-removed signal is smaller than the third reference voltage $V_{S3}$. The voltage $V_D$ input to the non-inverted input terminal of the comparator 104 is compared with the third reference voltage $V_{S3}$ which is input to the non-inverted terminal.

When the level of the signal $V_D$ is lower than the third reference voltage $V_{S3}$, a signal of a high level is output from the comparator 104. In this case, current flows to the capacitor 116 through the diode 112, as in the second embodiment, so that the capacitor 116 is gradually charged. Accordingly, the voltage between both ends of the capacitor 116 (the voltage level of the frequency control signal $V_f$) gradually increases so that the oscillation frequency of the VCO 56 is gradually lowered. When the level of the signal $V_D$ is higher than the third reference voltage $V_{S3}$, the output signal from the comparator 104 becomes low. Accordingly, the charge accumulated in the capacitor 116 is discharged, as in the second embodiment, so that the voltage between both ends of the capacitor 116 (the voltage level of the frequency control signal $V_f$) gradually decreases.

When the frequencies of the drive signals are higher than the drive frequency band of the ultrasonic motor 10, the amplitude of the detection signal $V_A$ output from the sensor electrode 26 becomes small so that the magnitude of variation in the voltage level of the voltage $V_C$, i.e., the amplitude of the signal $V_D$ output from the signal conversion circuit 86 also becomes small. Accordingly, the signal output from the comparator 104 is always high so that the voltage level of the frequency control signal $V_f$ is continuously increased, and the oscillation frequency of the VCO 56 (the frequencies of the drive signals) is gradually decreased accordingly. When the frequencies of the drive signals approach the optimum drive frequency of the ultrasonic motor 10, the detection signal $V_A$ has a proper constant amplitude, as shown in FIG. 11A. In this case, the signal $V_D$ input to the comparator 104 exceeds the third reference voltage $V_{S3}$ in the vicinity of each peak. Accordingly, a high level signal and a low level signal are alternately output from the comparator 104.

In the third embodiment, the resistances of the resistors 108 and 110 are determined such that when the frequencies of the drive signals are close to the optimum drive frequency, the decrease amount of the voltage level of the frequency control signal $V_f$ during the period in which the voltage level of the signal $V_D$ is greater than the third reference voltage $V_{S3}$ becomes equal to the increase amount of the voltage level of the frequency control signal $V_f$ during the period in which the voltage level of the signal $V_D$ is lower than the third reference voltage $V_{S3}$ so that the voltage level of the frequency control voltage $V_f$ is maintained substantially constant. Accordingly, the frequencies of the drive signals are maintained at a frequency close to the optimum drive frequency.

When the optimum drive frequency of the ultrasonic motor 10 varies due to a variation in the ambient temperature or a variation in the load acting on the ultrasonic motor 10 and the amplitude of the detection signal $V_A$ varies accordingly without the occurrence of irregularity in the waveform thereof, the magnitude of variation in the voltage level of the signal $V_C$, i.e., the amplitude of the signal $V_D$ varies. In this case, the ratio between the period in which the output signal from the comparator 104 maintains its high level state and the period in which the output signal from the comparator 104 maintains its low level state varies. With this operation, the voltage level of the frequency control signal $V_f$ is varied in accordance with the variation in the ratio, such that the frequencies of the drive signals vary (increase or decrease) to follow the varying optimum drive frequency of the ultrasonic motor 10.

When the frequencies of the drive signals enters the audible sound generating band of the ultrasonic motor 10, irregularity as shown in FIG. 11B occurs in the waveform of the detection signal $V_A$ so that the amplitude of the detection signal in each period fluctuates. Also, when the rotational velocity of the rotor decreases due to a large load acting on the ultrasonic motor, a considerable difference is produced between the traveling speed of the traveling wave in the stator and the rotational speed of the rotor, so that friction occurs therebetween and abnormal vibrations of an audible frequencies are generated, leading to the generation of an audible sound. However, in such a state, the detection signal sometimes has a small amplitude as a whole even though irregularity occurs in the detection signal, as shown in FIG. 11C. In the waveform of the detection signal $V_A$ shown in FIG. 11, the state in which the level of the detection signal $V_A$ does not exceed the predetermined level continues. Accordingly, the conventional frequency control decreases the frequencies of the drive signals of the ultrasonic motor, leading to the generation of a high audible sound.

However, when irregularity occurs in the waveform of the detection signal $V_A$, the voltage $V_C$ varies to follow the large peaks among large and small peaks of the signal which is obtained through the half-wave rectification of the detection signal $V_A$, as explained in the first embodiment, and the capacitor 90 is not charged when the amplitude of the signal obtained through the half-wave rectification of the detection signal $V_A$ is small. In this case, the level of the signal $V_C$ is continuously decreased. Accordingly, the magnitude of variation in the voltage level of the signal $V_C$, i.e., the amplitude of the signal $V_D$ becomes large.

Accordingly, in both the cases shown in FIG. 11B and FIG. 11C, the ratio of the period in which the output signal from the comparator 104 maintains its low level state becomes larger than that in the case where the frequencies of the drive signals are equal to the optimum drive frequency, so that the level of the frequency control signal $V_f$ is controlled to gradually decreases. With this operation, the frequencies of the drive signals are controlled to gradually increases or to return from the audible sound generating band to the drive frequency band, thereby preventing the ultrasonic motor 10 from generating a remarkable audible sound.

As described above, when it is judged that the magnitude of variation in the voltage level of the signal $V_C$ output from the signal output means is higher than the reference value, the drive circuit according to the third embodiment operates such that the ratio of the period in which the voltage level of the signal $V_D$ is greater than the third reference voltage $V_{S3}$ becomes larger so that the frequencies of the drive signals are increased. When it is judged that the magnitude of variation in the voltage level of the signal $V_C$ output from the signal output means is lower than the reference value, the drive circuit according to the third embodiment operates such that the ratio of the period in which the voltage level of the signal $V_D$ is lower than the third reference voltage $V_{S3}$ becomes larger so that the frequencies of the drive signals are decreased. Accordingly, the ultrasonic motor can be driven without generating a remarkable audible sound even in the case where the state in which the level of the detection signal is lower than the predetermined level continues due to the generation of an audible sound in the ultrasonic motor.

As described above, the frequency control means may be formed by removing means for removing the DC component from the signal output from the signal output means, and the control means for increasing the frequencies of the drive signals when the ratio between the period in which the level of the DC-component-removed signal obtained by the removing means is greater than the third reference level and the period in which the level of the DC-component-removed signal is smaller than the third reference level is greater than a predetermined value, and for decreasing the frequencies of the drive signals when the ratio is lower than the predetermined value.

Forth Embodiment

Figure 12:
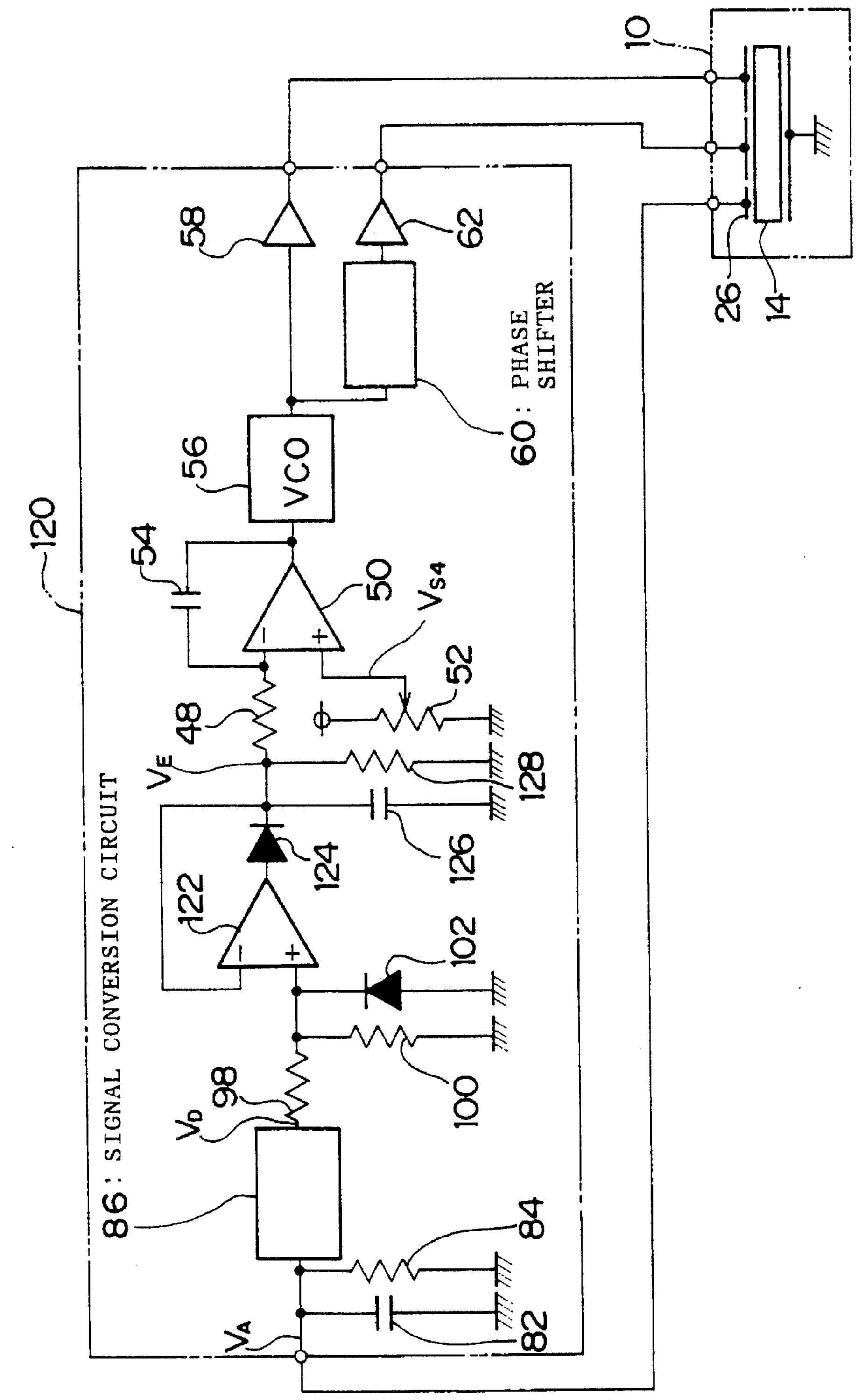
FIG. 12 is a circuit diagram of an ultrasonic motor drive circuit according to a fourth embodiment.

Next the fourth embodiment will be described. Same portions as those in the third embodiments are represented by the same reference symbols, and description therefor will be omitted. FIG. 12 shows a drive circuit 120 according to the fourth embodiment. In the drive circuit 120, the non-inverted input of an operational amplifier 122 is connected to the cathode of a diode 102. The output terminal of the operational amplifier 122 is connected to the anode of a diode 124. Connected to the cathode of the diode 124 are one end of a capacitor 126, one end of a resistor 128, one end of a resistor 48, and the inverted input terminal of the operational amplifier 122. The other end of the capacitor 126 and the other end of the resistor 128 are grounded. The resistor 48 forms an integration circuit in cooperation with an operational amplifier 50, a variable resistor 52 and a capacitor 54, as in the first embodiment.

Next the operation of the fourth embodiment will be described. Similarly to the above-described embodiment, the signal from the signal conversion circuit 86 is subjected to voltage division by resistors 98 and 100, and the negative portions thereof are cut by the diode 102 to obtain a signal $V_D$, which is then input to the operational amplifier 122. The operational amplifier 122, the diode 124, the capacitor 126 and the resistor 128 form signal output means having the same structure as that of the signal output means of the drive circuit 66 (see FIG. 5). Accordingly, when the voltage level of the signal $V_D$ is higher than the voltage between both ends of the capacitor 126, the capacitor 126 is charged. When the voltage level of the signal $V_D$ is lower than the voltage between both ends of the capacitor 126, the charging of the capacitor 126 is stopped, and the charge in the capacitor 126 is gradually discharged through the resistor 128.

Accordingly, the signal $V_E$ output from the circuit formed by the operational amplifier 122, the diode 124, the capacitor 126 and the resistor 128 has a voltage level which approximately follows the peaks of the voltage level of the signal $V_D$ which has an amplitude corresponding to the magnitude of variation in the signal $V_C$. In other words, the signal $V_E$ has a voltage level corresponding to the magnitude of variation in the signal $V_C$. In the fourth embodiment, the magnitude of variation in the signal $V_C$ is detected based on the signal $V_E$ which is obtained by removing the DC component from the signal $V_C$ and smoothing the DC-component-removed signal. In the integration circuit formed by the resistor 48, the operational amplifier 50, the variable resistor 52 and the capacitor 54, the voltage level of the signal $V_E$ is compared with the fourth reference voltage $V_{S4}$. The voltage level of the frequency control signal $V_f$ is varied based on the results of the comparison in the same manner as in the first embodiment.

In the fourth embodiment, the voltage level of the frequency control signal $V_f$ is controlled such that when the magnitude of variation in the voltage level of the signal $V_C$ output from the signal output means is higher than the reference value, the frequencies of the drive signals are increased, and that when the magnitude of variation in the voltage level of the signal $V_C$ output from the signal output means is lower than the reference value, the frequencies of the drive signals are decreased. Accordingly, the ultrasonic motor can be driven without generating a remarkable audible sound even in the case where the state in which the level of the detection signal is lower than the predetermined level continues due to the generation of an audible sound in the ultrasonic motor.

As described above, the frequency control means may be formed by removing means for removing the DC component from the signal output from the signal output means, smoothing means for smoothing the DC-component-removed signal to obtain a signal approximately following the peaks of the DC-component-removed signal, and the control means for increasing the frequencies of the drive signals when the average level of the smoothed signal obtained by the smoothing means is greater than the reference value, and for lowering the frequencies of the drive signals when the average level of the smoothed signal is lower than the reference value.

Although, in the third and forth embodiments, the circuit formed by the diode 88, the capacitor 90, the resistor 92 is used as the signal output means, the signal output means is not limited thereto. For example, the operational amplifier 38 may be added as in the drive circuit 66 (see FIG. 5), or the operational amplifier 46 may be added as in the drive circuit 30 (see FIG. 3) to form the signal output means.

Fifth Embodiment

Figure 13:
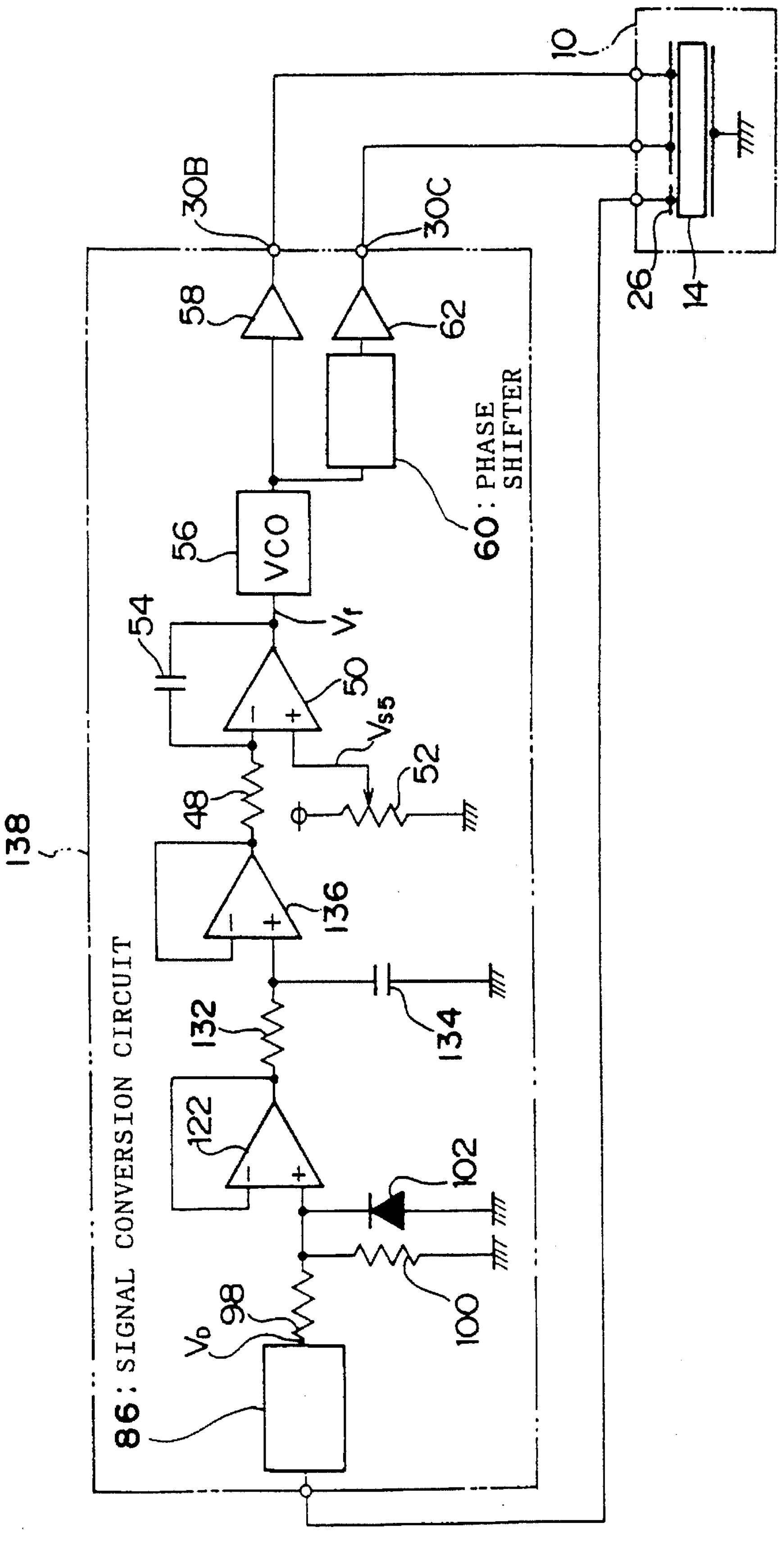
FIG. 13 is a circuit diagram showing another example of the structure of the ultrasonic motor drive circuit.

Another example of the drive circuit according to the invention will be described. First, a drive circuit 138 shown in FIG. 13 will be described, focusing on portions different from those of the drive circuit 120 shown in FIG. 12. The drive circuit 138 is formed by omitting the diode 124 from the drive circuit 120. The output terminal and the inverted input terminal of the operational amplifier 122 are directly connected with each other. An average value detection circuit formed by a resistor 132, a capacitor 134 and an operational amplifier 136 is connected to the output terminal of the operational amplifier 122, like the drive circuit 130 shown in FIG. 7. One end of a resistor 48 forming an integration circuit is connected to the output terminal of the average value detection circuit.

Since the operational amplifier 122 serves as a voltage follower, the voltage level output from the operational amplifier 122 is equal to the voltage level of a signal which is obtained by subjecting the signal $V_D$ to potential division and half-wave rectification. The signal is averaged by the average value detection circuit and is then input to the integration circuit formed by a resistor 48, an operational amplifier 50, a variable resistor 52, and a capacitor 54. Accordingly, the voltage level of the signal input to the integration circuit roughly corresponds to the average value of the magnitude of variation in the voltage level of the signal $V_C$ output from the signal output means. In the integration circuit, the voltage level of the above-described signal and the fifth reference voltage $V_{S5}$ are compared with each other, and the voltage level of the frequency control signal $V_f$ is varied based on the results of the comparison, as in the first embodiment.

According to the fifth embodiments, the voltage level of the frequency control signal $V_f$ is controlled such that when the average value of the magnitude of variation in the voltage level of the signal $V_C$ output from the signal output means is higher than the reference value, the frequencies of the drive signals are increased, and that when the average value of the magnitude of variation in the voltage level of the signal $V_C$ output from the signal output means is lower than the reference value, the frequencies of the drive signals are decreased. Accordingly, the ultrasonic motor can be driven without generating a remarkable audible sound even in the case where the state in which the level of the detection signal is lower than the predetermined level continues due to the generation of an audible sound in the ultrasonic motor.

As described above, the frequency control means may be formed by removing means for removing the DC component from the signal output from the signal output means, rectifying means for rectifying the DC-component-removed signal obtained by the removing means, average value detection means for detecting the average value of the rectified signal obtained by the rectifying means, and the control means for increasing the frequencies of the drive signals when the average value detected by the average value detection means is greater than the reference value, and for lowering the frequencies of the drive signals when the average value is lower than the reference value.

Figure 14:
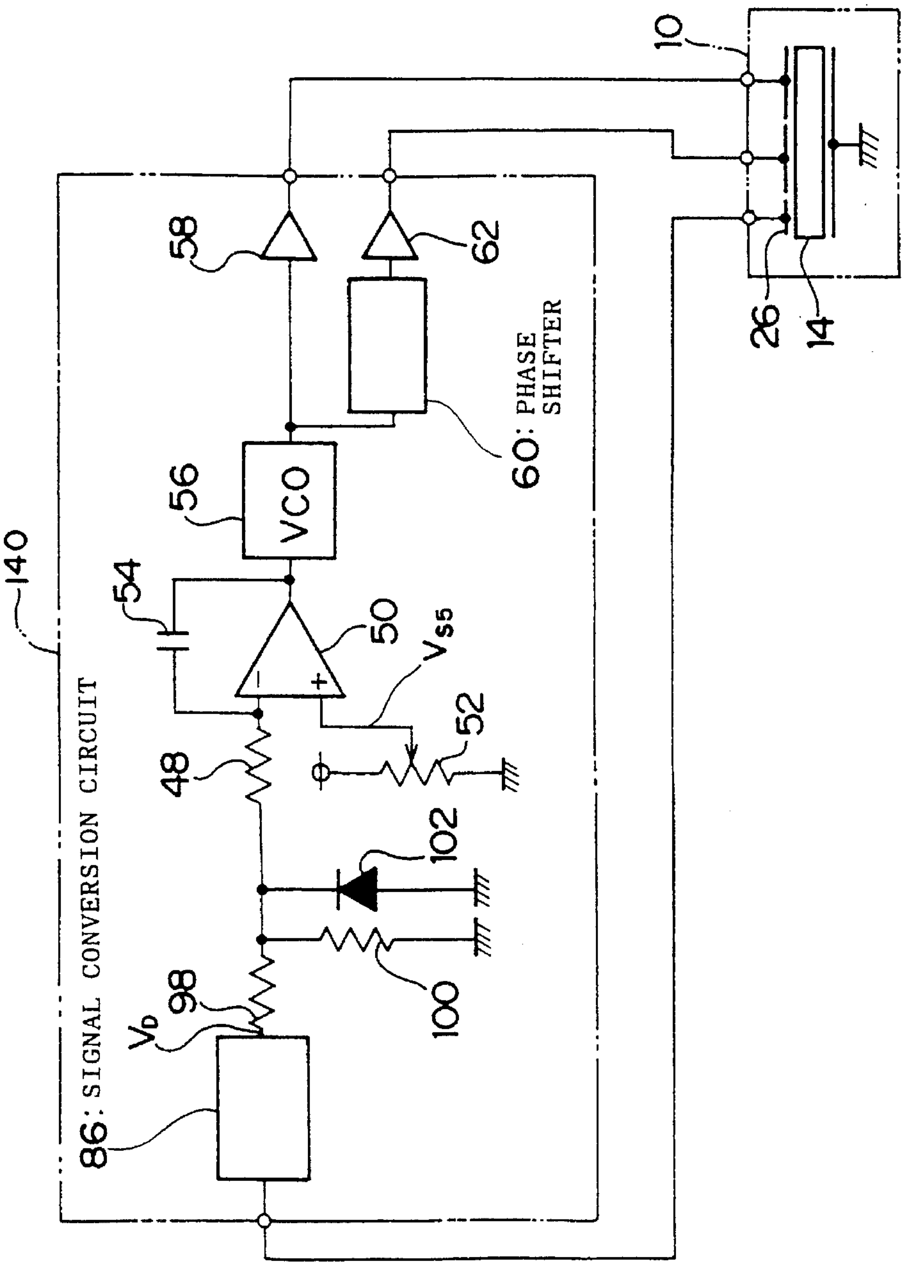
FIG. 14 is a circuit diagram showing another example of the structure of the ultrasonic motor drive circuit.

Next, a drive circuit 140 shown in FIG. 14 will be described. Compared to the above-described drive circuit 138, the operational amplifier 122 operating as a voltage follower and the average value detection circuit formed by the resistor 132, the capacitor 134 and the operational amplifier 136 are omitted in the drive circuit 140. The cathode of a diode 102 is connected to one end of a resistor 48 forming a part of an integration circuit.

In the drive circuit 140 having the above-described structure, a signal which is obtained by subjecting the signal $V_D$ to potential division and half-wave rectification is input to the integration circuit. Accordingly, the voltage level of the signal $V_f$ is varied based on the results of comparison between the average voltage level of the signal which is obtained by subjecting the signal $V_D$ to potential division and half-wave rectification (in accurate, the voltage level of a signal obtained by smoothing the above-described signal), and a fifth reference voltage $V_{S5}$. Accordingly, the frequencies of the drive signals are controlled in accordance with the average of the magnitude of variation in the signal output from the signal output means.

Since, a voltage follower is omitted in the drive circuit 140, the stability of the signal input to the integration circuit is lower compared to the drive circuit 138. Also, since the average value detection circuit is omitted, the frequencies of the drive signals are not accurately controlled in accordance with the average value of the magnitude of variation in the signal $V_C$. Accordingly, there is a possibility that the accuracy in controlling the frequencies of the drive signals with respect to the magnitude of variation in the signal $V_C$ slightly decreases. However, costs can be reduced because of the simplified structure of the drive circuit.

The frequency control means may be formed by removing means for removing the DC component from the signal output from the signal output means, rectifying means for rectifying the DC-component-removed signal obtained by the removing means, and the control means for increasing the frequencies of the drive signals when the average level of the signal obtained by the rectifying means is greater than the reference value, and for lowering the frequencies of the drive signals when the average level is lower than the reference value.

Sixth Embodiment

Figure 15:
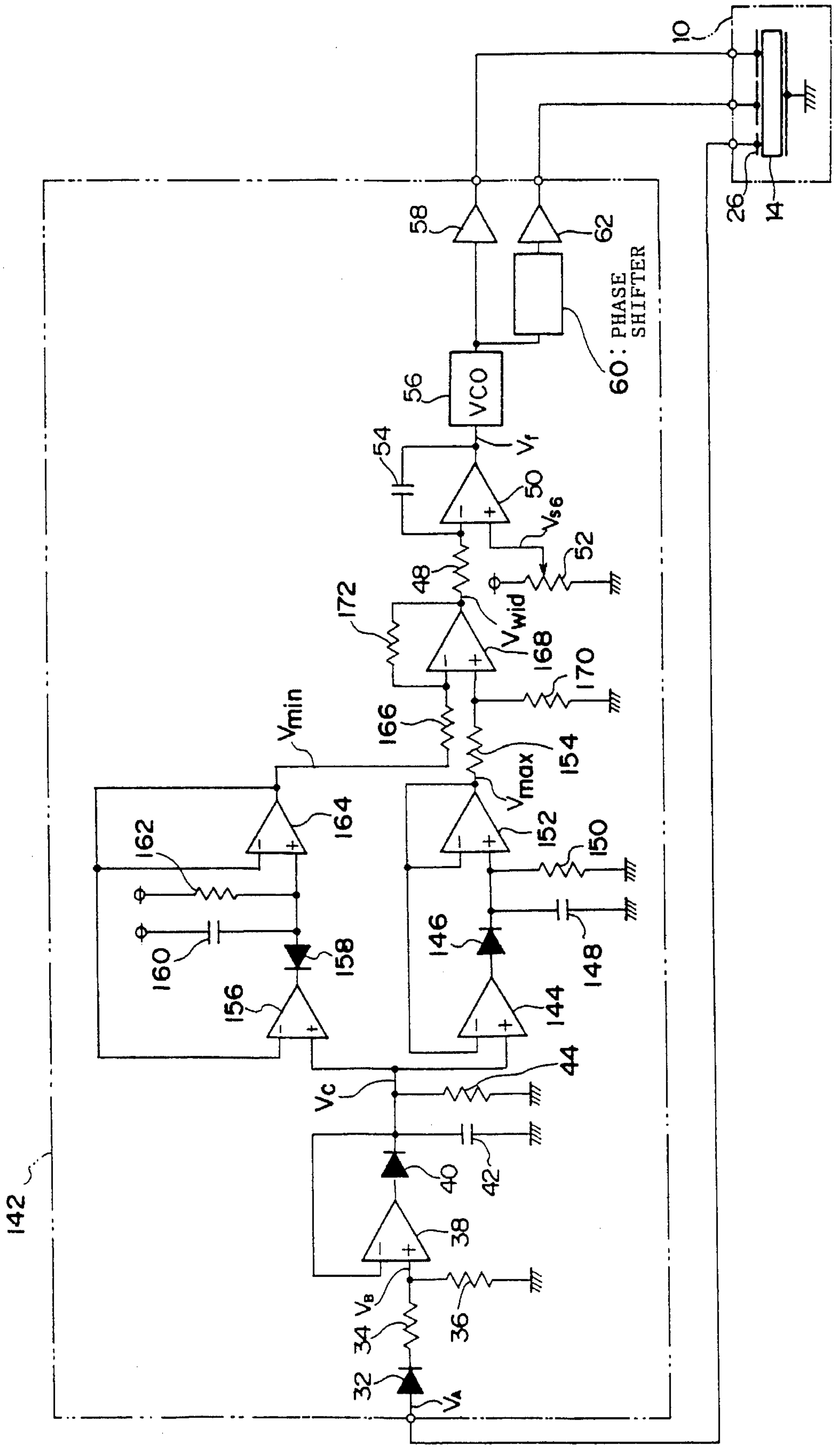
FIG. 15 is a circuit diagram showing another example of the structure of the ultrasonic motor drive circuit.

Next, a drive circuit 142 shown in FIG. 15 will be described. In the drive circuit 142, a variation magnitude detection circuit is provided between the resistors 44 and 48 in the drive circuit 66 shown in FIG. 5. In detail, the line connected to the cathode of a diode 40 is branched into two lines, one of which is connected to the non-inverted input terminal of an operational amplifier 144, and the other of which is connected to the non-inverted input of an operational amplifier 156. The output terminal of the operational amplifier 144 is connected to the anode of a diode 146. The cathode of the diode 146 is connected to one end of a capacitor 148, one end of a resistor 150, and the non-inverted input of the operational amplifier 152. The other end of the capacitor 148 and the other end of the resistor 150 are grounded. The output terminal of the operational amplifier 152 is connected to the inverted inputs of the operational amplifiers 144 and 152, respectively, and to one end of a resistor 154. The other end of the resistor 154 is connected to one end of a resistor 170, whose other end is grounded, and to the non-inverted input terminal of the operational amplifier 168.

Also, the output terminal of the operational amplifier 156 is connected to the cathode of a diode 158. The anode of the diode 158 is connected to one end of a capacitor 160, one end of a resistor 162, and the non-inverted input of the operational amplifier 164. The other end of the capacitor 160 and the other end of the resistor 162 are both connected to a constant voltage power source. The output terminal of the operational amplifier 164 is connected to the inverted inputs of the operational amplifiers 156 and 164, respectively, and to one end of a resistor 166. The other end of the resistor 166 is connected to the inverted input terminal of the operational amplifier 168. The inverted input of the operational amplifier 168 is connected to the output terminal of the operational amplifier 168 through a resistor 172. The output terminal of the operational amplifier 168 is connected to one end of a resistor 48. The resistors 154, 166,170 and 172 have the same resistance.

In the drive circuit 142, an operational amplifier 38, a diode 40, a capacitor 42 and a resistor 44 form signal output means, as in the drive circuit 66 shown in FIG. 5. The signal $V_C$ output from the signal output means is input to the operational amplifiers 144 and 156 of the variation magnitude detection circuit, respectively.

A circuit formed by the operational amplifier 144, the diode 146, the capacitor 148, the resistor 150, and the operational amplifier 152 (hereinafter referred to as a maximum value detection circuit) has the same structure as that of a portion of the drive circuit 30 shown in FIG. 3 which corresponds to the signal output means. When the voltage level of the signal $V_C$ is higher than the voltage between both ends the capacitor 148, the capacitor 148 is charged at a small time constant. When the voltage level of the signal $V_C$ is lower than the voltage between both ends of the capacitor 148, the charge accumulated in the capacitor 148 is gradually discharged through the resistor 150. Since the voltage level of a signal output from the operational amplifier 152 is equal to the voltage between both ends of the capacitor 148, the maximum value detection circuit outputs a signal $V_{max}$ having a voltage level corresponding to the maximum value of the voltage level of the signal $V_C$.

A circuit formed by the operational amplifier 156, the diode 158, the capacitor 160, the resistor 162, and the operational amplifier 164 (hereinafter referred to as a minimum value detection circuit) differs from the maximum value detection circuit in that the direction of the diode 58 is opposite, and the capacitor 160 and the resistor 162 are connected to the constant voltage power source. Accordingly, when the potential at the one end of the capacitor 160 whose other end is connected to the constant voltage power source is higher than the voltage level of the signal $V_C$, the potential at the one end of the capacitor 160 is lowered at a very small time constant. When the potential at the one end of the capacitor 160 is lower than the voltage level of the signal $V_C$, the potential at the one end of the capacitor 160 is gradually raised by the operation of the resistor 162. Since the voltage level of a signal output from the operational amplifier 164 is equal to the potential at the one end of the capacitor 160, the minimum value detection circuit outputs a signal $V_{min}$ having a voltage level corresponding to the minimum value of the voltage level of the signal $V_C$.

The signals output from the maximum value detection circuit and the minimum value detection circuit are input to the operational amplifier 168 through the resistors 154 and 166. Since the resistors 154, 166, 170 and 172 have the same resistance, the operational amplifier 168 operates as a subtraction circuit. The voltage level $V_{wid}$ of the signal output from the operational amplifier 168 is expressed as follows:

$$V_{wid} = \frac{R_2}{R_1}(V_{max} - V_{min}) \qquad (4)$$

where $R_1$ represents the resistances of the resistors 154 and 166, and $R_2$ represents the resistances of the resistors 170 and 172. Accordingly, a signal having a voltage level corresponding to the difference between the maximum value and the minimum value of the voltage level of the signal $V_C$, i.e., the magnitude of variation in the voltage level of the signal $V_C$ is output. This signal is input to the integration circuit formed by the resistance 48, the capacitor 54 and the operational amplifier 50, and is compared with a reference value $V_{S6}$ for the magnitude of variation (corresponding to $d_O$ shown in FIG. 1). As a result, the frequencies of the drive signals are varied in accordance with the magnitude of the variation in the signal $V_C$. Although the drive circuit 142 is complex compared to the drive circuits described in the third, fourth and fifth embodiments, the magnitude of variation in the voltage level of the signal $V_C$ output from the signal output means can be obtained accurately. Accordingly, the frequencies of the drive signals can be accurately controlled in accordance with the magnitude of variation.

The frequency control means may be formed by maximum value detection means for detecting the maximum value of the level of the signal output from the signal output means, minimum value detection means for detecting the minimum value of the level of the signal output from the signal output means, calculation means for calculating the difference between the detected maximum value and the detected minimum value, and the control means for increasing the frequencies of the drive signals when the calculated difference is greater than the reference value, and for lowering the frequencies of the drive signals when the difference is lower than the reference value.

The circuit formed by the operational amplifier 38, the diode 40, the capacitor 42, and the resistor 44 and corresponding to the signal output means may be replaced with the portion of the drive circuit 30 shown in FIG. 3, which corresponds to the signal output means, or the portion of the drive circuit 68 shown in FIG. 6, which corresponds to the signal output means.

In the above described embodiments, the drive circuits for the ultrasonic motor according to the present invention is formed by analog circuits. However, each drive circuit may be partially replaced with a micro computer or a digital circuit such that the above-described operation of each drive circuit is partially performed by the micro computer or the digital circuit.

While the embodiments of the present invention, as herein disclosed, constitute a preferred form, it is to be under stood that other forms might be adopted.

What is claimed is:

1. A drive circuit for an ultrasonic motor comprising:

a drive signal generator for outputting ultrasonic motor drive signals of predetermined frequencies;

a detector for detecting vibration of a stator of said ultrasonic motor and for outputting a detection signal whose amplitude corresponds to said vibration;

a signal output device for outputting an output signal of a level which coincides with the level of the detection signal when the level of the detection signal exceeds the level of the output signal of said signal output device, and for outputting an output signal which decreases at a decrease rate smaller than a predetermined value when the level of the detection signal is smaller than the level of the output signal of said signal output device; and a frequency controller for raising the frequencies of said drive signals when the average level of the signal output from said signal output device is greater than a first reference level and for lowering the frequencies of said drive signals when the average level of the signal output from said signal output device is smaller than the first reference level.

2. A drive circuit for an ultrasonic motor according to claim 1, wherein said frequency controller detects the average level of the signal output from said signal output device based on the ratio between the period in which the level of the signal output from said signal output device is greater than a second reference level and the period in which the level of said signal is smaller than the second reference level.

3. A drive circuit for an ultrasonic motor comprising:

a drive signal .generator for outputting ultrasonic motor drive signals of predetermined frequencies;

a detector for detecting vibration of a stator of said ultrasonic motor and for outputting a detection signal whose amplitude corresponds to said vibration;

a signal output device for outputting an output signal of a level which coincides with the level of the detection signal when the level of the detection signal exceeds the level of the output signal of said signal output device, and for for outputting an output signal which decreases at a decrease rate smaller than a predetermined value when the level of the detection signal is smaller than the level of the output signal of said signal output device; and a frequency controller for raising the frequencies of said drive signals when the magnitude of variation in the level of the signal output from said signal output device is greater than a reference value and for lowering the frequencies of said drive signals when the magnitude of variation in the level of the signal output from said signal output device is smaller than the reference value.

4. A drive circuit for an ultrasonic motor according to claim 3, wherein said frequency controller detects the magnitude of variation in the level of the signal output from said signal output device based on the level of a smoothed signal of a DC-component removed signal, which is obtained by removing the DC component from the signal from said signal output device and then by smoothing the DC-component-removed signal in such a manner as to substantially follow the peaks of the DC-component-removed signal.

5. A drive circuit for an ultrasonic motor according to claim 3, wherein said frequency controller detects the magnitude of variation in the level of the signal output from said signal output device based on the ratio between the period in which a level of a DC-component-removed signal obtained by removing the DC component from the signal output from said signal output device is greater than a third reference level and the period in which the level of the DC-component-removed signal is smaller than the third reference level.

6. A drive circuit for an ultrasonic motor according to claim 3, wherein said frequency controller rectifies a signal which is obtained by removing the DC component from the signal output from said signal output device, and detects the magnitude of variation in the level of the signal output from said signal output device based on the average level of the rectified signal.

7. A drive circuit for an ultrasonic motor according to claim 3, wherein said frequency controller detects a maximum value and a minimum value of the level of the signal output from said signal output device, calculates a difference between the detected maximum value and the detected minimum value, and detects the magnitude of variation in the level of the signal output from said signal output device based on the calculated difference.

* * * * *